: US009853728B2

(12) United States Patent
Nishihara et al.

(10) Patent No.: US 9,853,728 B2
(45) Date of Patent: Dec. 26, 2017

(54) METHOD FOR DETERMINING NUMBERS OF BITS ALLOCATED TO SUBCARRIERS AND OPTICAL TRANSMISSION SYSTEM

(71) Applicant: FUJITSU LIMITED, Kawasaki-shi, Kanagawa (JP)

(72) Inventors: Masato Nishihara, Kawasaki (JP); Toshiki Tanaka, Setagaya (JP); Yutaka Kai, Kawasaki (JP); Ryou Okabe, Shinagawa (JP); Tomoo Takahara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/253,431

(22) Filed: Aug. 31, 2016

(65) Prior Publication Data

US 2017/0070286 A1 Mar. 9, 2017

(30) Foreign Application Priority Data

Sep. 3, 2015 (JP) .................. 2015-173790

(51) Int. Cl.
*H04B 10/00* (2013.01)
*H04B 10/079* (2013.01)
(Continued)

(52) U.S. Cl.
CPC ..... *H04B 10/07957* (2013.01); *H04B 10/572* (2013.01); *H04J 14/0239* (2013.01)

(58) Field of Classification Search
CPC ............... H04B 10/564; H04B 10/503; H04B 10/2504; H04B 10/07953; H04B 10/5161;
(Continued)

(56) References Cited

U.S. PATENT DOCUMENTS 5,995,254 A 11/1999 Koga et al.
8,064,897 B2 11/2011 Matsumoto et al.
(Continued)

FOREIGN PATENT DOCUMENTS

EP  2797248  10/2014
JP  9-191291  7/1997
(Continued)

OTHER PUBLICATIONS

USPTO [HAHN]—Notice of Allowance dated May 25, 2017 for U.S. Appl. No. 14/976,830.
(Continued)

*Primary Examiner* — Hanh Phan
(74) *Attorney, Agent, or Firm* — Fujitsu Patent Center

(57) ABSTRACT

A bit allocation method is used in an optical transmission system that transmits multicarrier signals of different wavelengths in wavelength division multiplexing. Frequency characteristics of subcarriers included in the multicarrier signals are different between the respective multicarrier signals. The method includes: measuring transmission characteristics of the subcarriers included in corresponding multicarrier signals at different subcarrier frequencies; and determining a number of bits to be allocated to each of the subcarriers included in each of the multicarrier signals based on the transmission characteristics measured at the different subcarrier frequencies.

7 Claims, 17 Drawing Sheets

(51) Int. Cl.
*H04J 14/02* (2006.01)
*H04B 10/572* (2013.01)

(58) Field of Classification Search
CPC .............. H04B 10/572; H04J 14/0298; H04J 14/0239; H04J 14/0221
USPC ....... 398/182, 183, 188, 192, 193, 194, 195, 398/196, 197, 198, 199, 79, 158, 159, 33, 398/38, 25, 26, 27, 135, 136, 202, 208, 398/209, 162, 76
See application file for complete search history.

(56) References Cited

U.S. PATENT DOCUMENTS

| | | | |
|---|---|---|---|
| 2002/0005967 | A1 | 1/2002 | Suzuki |
| 2002/0031113 | A1 | 3/2002 | Dodds et al. |
| 2013/0209093 | A1 | 8/2013 | Tanimura et al. |
| 2016/0112238 | A1* | 4/2016 | Ling .................. H04B 10/50 375/261 |
| 2016/0142150 | A1* | 5/2016 | Lyubomirsky ...... H04J 14/0257 398/182 |
| 2016/0197679 | A1* | 7/2016 | Tanaka ................ H04B 10/572 398/79 |

FOREIGN PATENT DOCUMENTS

| | | |
|---|---|---|
| JP | 2002-26822 | 1/2002 |
| JP | 2005-244958 | 9/2005 |
| JP | 2006-135487 | 5/2006 |
| JP | 2013-48373 | 3/2013 |
| JP | 2013-165407 | 8/2013 |
| WO | 02/065671 | 8/2002 |

OTHER PUBLICATIONS

EESR—The Extended European Search Report dated May 30, 2016 in corresponding EP application No. 15198636.1.
USPTO—Non-Final Rejection dated Nov. 7, 2016 for related U.S. Appl. No. 14/976,830 [pending].
USPTO—Notice of Allowance dated Feb. 23, 2017 for related U.S. Appl. No. 14/976,830 [pending].

* cited by examiner

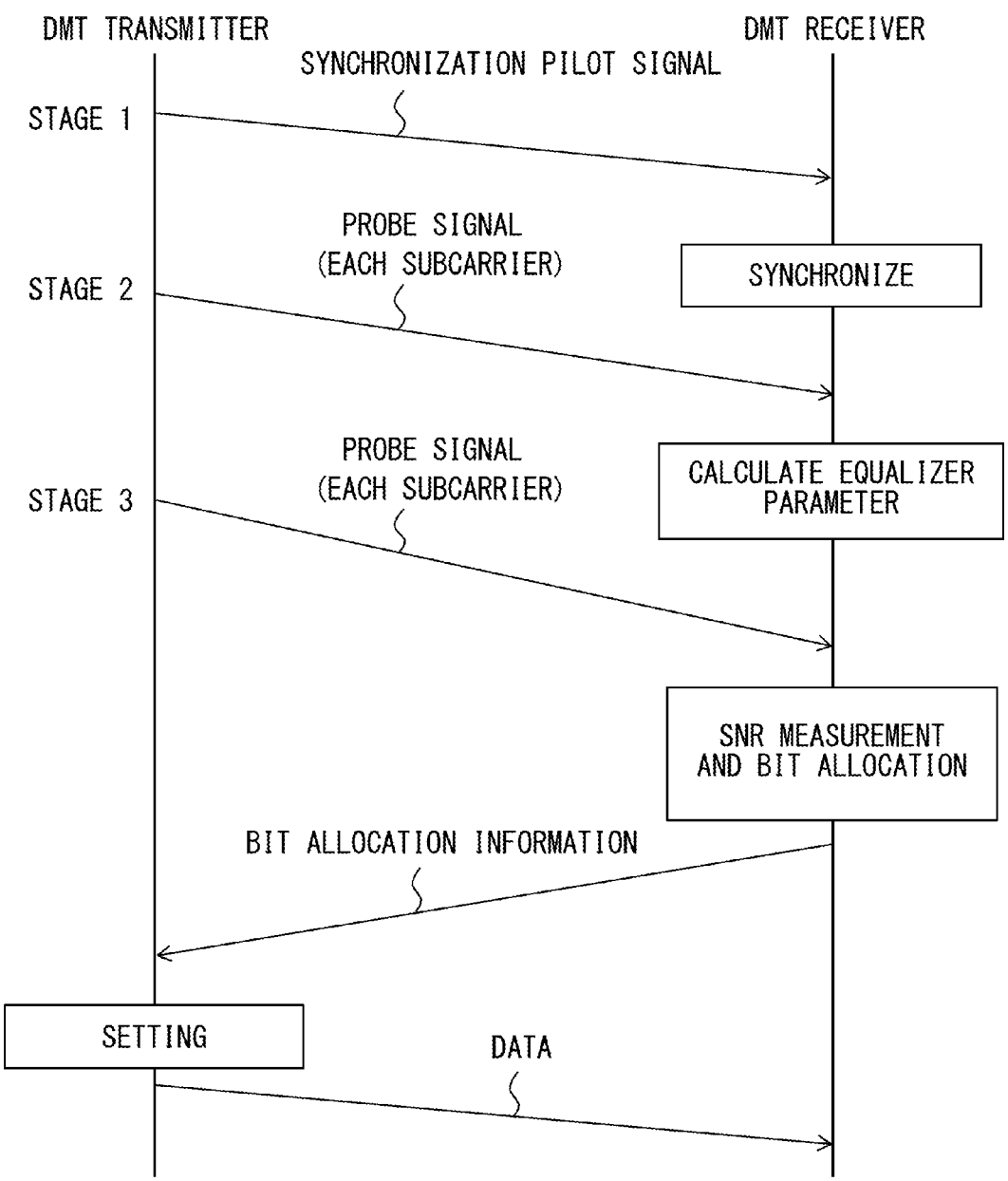
F I G. 3

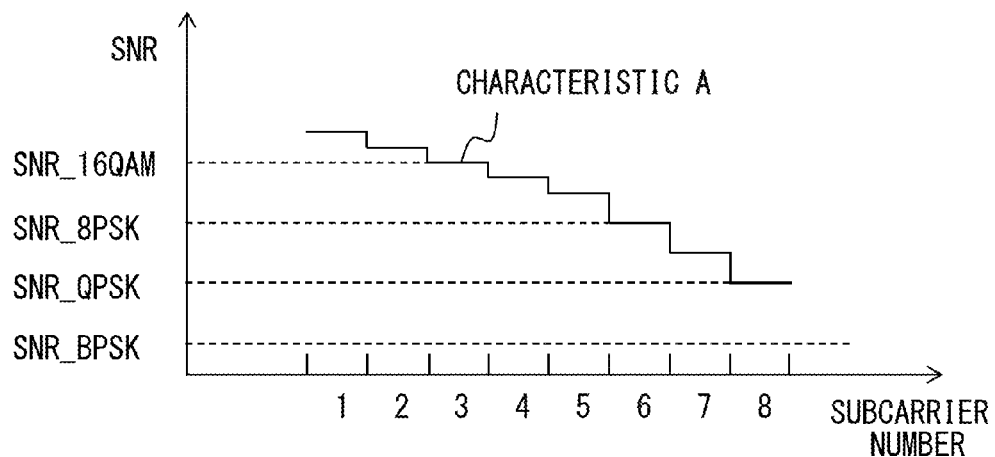
F I G. 1 0 A
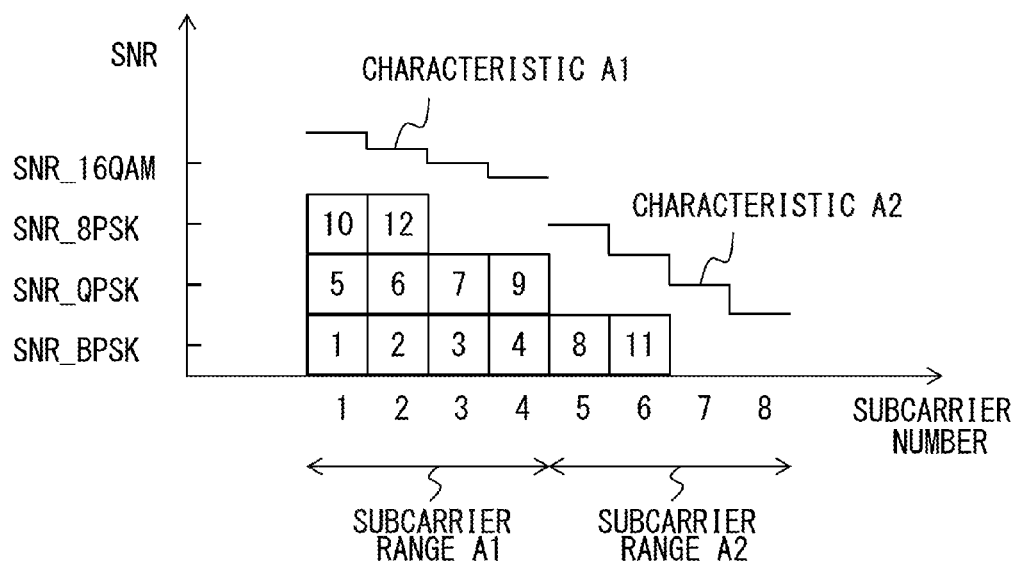
F I G. 1 0 B

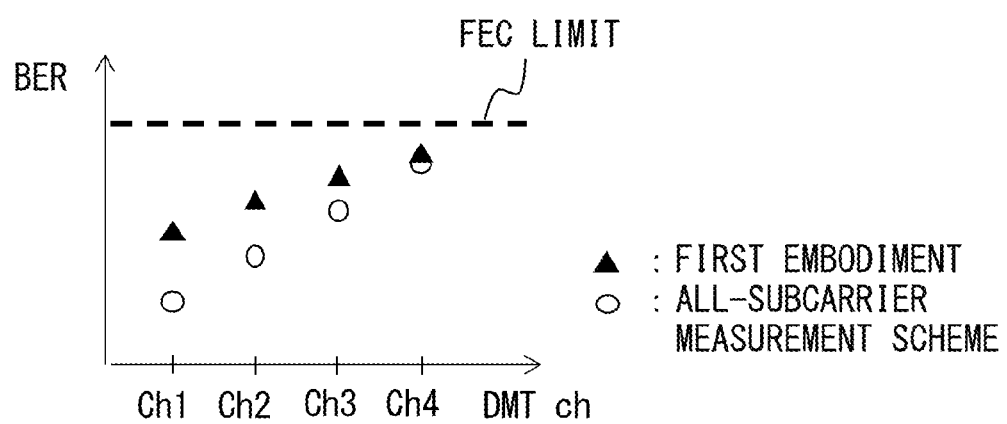
F I G. 1 2

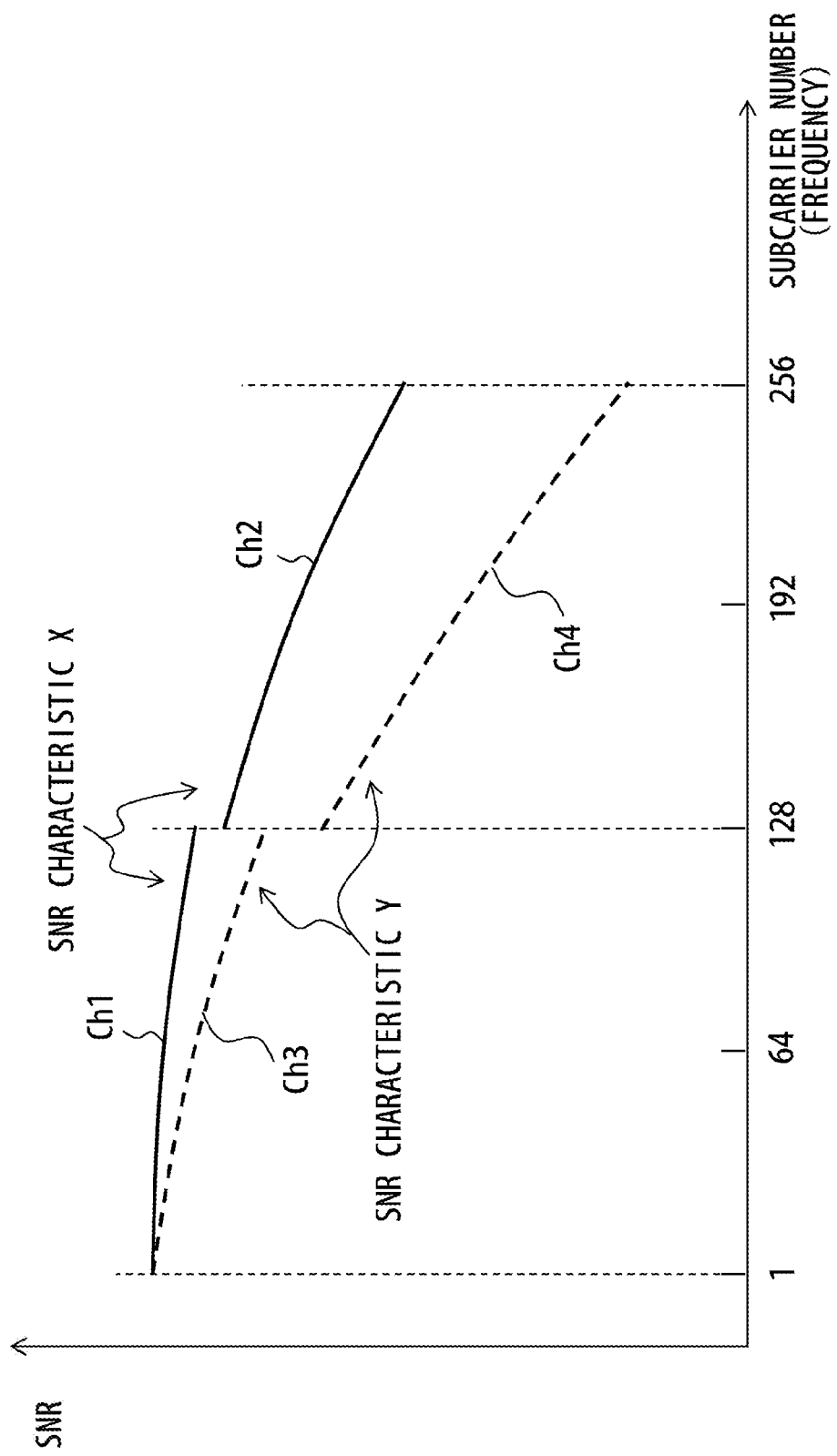
F I G. 17

US 9,853,728 B2

METHOD FOR DETERMINING NUMBERS OF BITS ALLOCATED TO SUBCARRIERS AND OPTICAL TRANSMISSION SYSTEM

CROSS-REFERENCE TO RELATED APPLICATION

This application is based upon and claims the benefit of priority of the prior Japanese Patent Application No. 2015-173790, filed on Sep. 3, 2015, the entire contents of which are incorporated herein by reference.

FIELD

The embodiments discussed herein are related to a bit allocation method for determining the numbers of bits allocated to subcarriers included in respective multicarrier signals of different wavelengths, and an optical transmission system that transmits the multicarrier signals.

BACKGROUND

In recent years, as an example of a technology for improving a data transmission rate, Discrete Multi-Tone (DMT) modulation has been put into practical use. DMT modulation is one of a multicarrier transmission schemes, and data is transmitted by using a plurality of subcarriers. Namely, in DMT modulation, a plurality of subcarriers are allocated to one signal band. Data is transmitted by using respective subcarriers. Accordingly, by allocating a large number of subcarriers to one signal band, a large capacity of data transmission is achieved without increasing transmission rates of the respective subcarriers.

In a DMT transmission system, DMT negotiation is performed between a pair of transmission stations before data transmission is started. In DMT negotiation, the quality of each of the subcarriers in a DMT signal is detected, and the number of bits to be allocated to each of the subcarriers in the DMT signal is determined in accordance with the detected quality. At this time, a modulation format of each of the subcarriers in the DMT signal is determined. Consequently, efficient data transmission is achieved without deterioration of the communication quality of each of the subcarriers.

An automatic negotiation system of a communication rate that realizes data transmission in which data is not discarded between terminal devices that are connected to each other via an optical fiber has been proposed (for example, Japanese Laid-open Patent Publication No. 2006-135487). In addition, Japanese Laid-open Patent Publication No. 9-191291 describes a related technology.

Another example of a technology for achieving an increase in capacity of a communication system, Wavelength Division Multiplexing (WDM) has been popular. In WDM, data is transmitted by using a plurality of wavelengths different from each other. Stated another way, in WDM, a plurality of wavelength channels are multiplexed. By applying DMT modulation to the respective wavelength channels in WDM, further speeding-up or an increase in capacity of the communication system is achieved.

In a system in which DMT modulation is applied to respective wavelength channels in WDM, the number of subcarriers used to transmit data inevitably increases. However, in order to realize efficient data transmission, DMT negotiation needs to be performed on respective subcarriers, as described above. Accordingly, in the system in which DMT modulation is applied to respective wavelength channels in WDM, the time needed to perform DMT negotiation that is performed before data transmission is started increases. Note that this problem does not occur only in a DMT transmission system, but this problem may occur in an optical transmission system in which multicarrier modulation is applied to respective wavelength channels in WDM.

SUMMARY

According to an aspect of the embodiments, a bit allocation method is used in an optical transmission system that transmits multicarrier signals of different wavelengths in wavelength division multiplexing. Frequency characteristics of subcarriers included in the multicarrier signals are different between the respective multicarrier signals. The method includes: measuring transmission characteristics of the subcarriers included in corresponding multicarrier signals at different subcarrier frequencies; and determining a number of bits to be allocated to each of the subcarriers included in each of the multicarrier signals based on the transmission characteristics measured at the different subcarrier frequencies.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates a procedure of DMT negotiation.

FIGS. 10A and 10B illustrate an example of a method for determining bit allocation according to SNR characteristics.

FIG. 12 illustrates a transmission characteristic of a DMT modulated optical signal.

FIG. 17 illustrates SNR characteristics obtained in DMT negotiation according to the third embodiment.

DESCRIPTION OF EMBODIMENTS

An optical transmission system according to the embodiments transmits a WDM optical signal. In WDM, a plurality of wavelength channels are multiplexed. DMT modulation is applied to the respective wavelength channels in WDM. A method for transmitting a DMT modulated signal through one wavelength channel is described first. DMT modulation is an example of a multicarrier transmission scheme, and data is transmitted by using a plurality of subcarriers.

Figure 1:
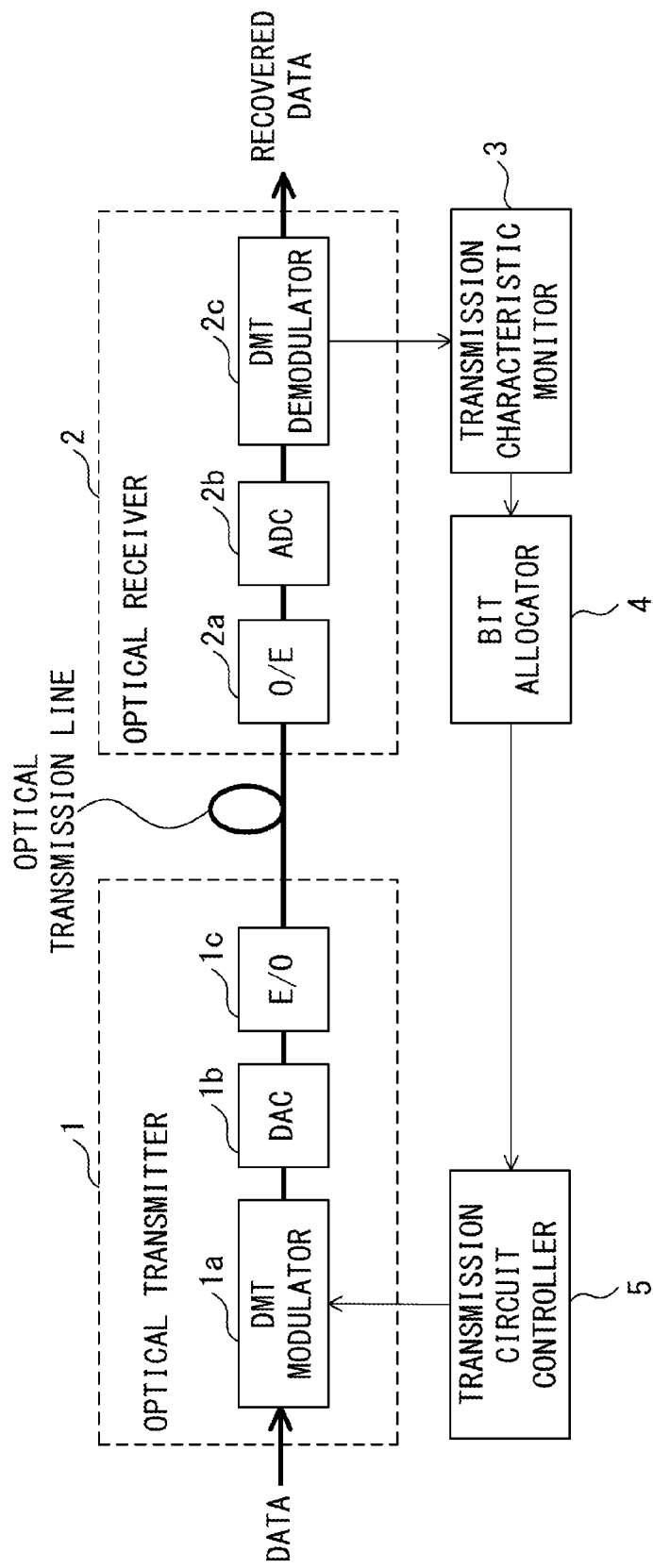
FIG. 1 illustrates an example of an optical transmission system that transmits data by using DMT modulation.

FIG. 1 illustrates an example of an optical transmission system that transmits data by using DMT modulation. Assume that a DMT modulated optical signal is transmitted from an optical transmitter 1 to an optical receiver 2. An optical fiber transmission line is provided between the optical transmitter 1 and the optical receiver 2. One or more optical amplifiers may be provided on the optical fiber transmission line.

The optical transmitter 1 includes a DMT modulator 1a, a D/A (Digital-to-Analog) converter 1b, and an E/O (Electrical-to-Optical) device 1c. The DMT modulator 1a generates a DMT modulated signal from data. Data is divided and allocated to a plurality of subcarriers. Accordingly, even when high-speed data is transmitted, the data allocated to respective subcarriers can be reduced in speed. Note that the plurality of subcarriers have frequencies different from each other.

The D/A converter 1b converts the DMT modulated signal generated by the DMT modulator 1a into an analog signal. The E/O device 1c generates a DMT modulated optical signal from the analog DMT modulated signal. The E/O device 1c is not particularly limited, but the E/O device 1c is implemented, for example, by a Directly Modulated Laser (DML).

Figure 2A:
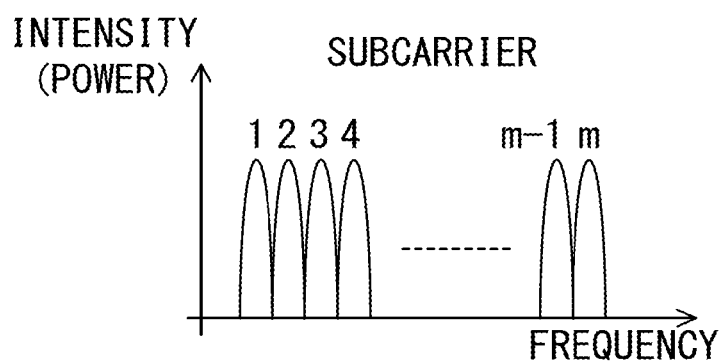
FIGS. 2A-2C are diagrams explaining DMT modulation.

FIG. 2A illustrates an example of a spectrum of a DMT modulated optical signal. In this example, in DMT modulation, data is transmitted by using m subcarriers 1-m. The optical intensity (or optical power) of each of the subcarriers is substantially equalized. The DMT modulated optical signal is transmitted via an optical fiber transmission line, and is received by the optical receiver 2.

The optical receiver 2 includes an O/E (Optical-to-Electrical) device 2a, an A/D (Analog-to-Digital) converter 2b, and a DMT demodulator 2c. The O/E device 2a converts the received DMT modulated optical signal into an electric signal. The O/E device 2a is configured to include, for example, a photodiode. The A/D converter 2b converts a signal output from the O/E device 2a into a digital signal. The DMT demodulator 2c performs DMT demodulation on the digital signal output from the A/D converter 2b so as to recover data.

In the optical transmission system illustrated in FIG. 1, bit allocation (bit loading) to the respective subcarriers is determined according to a transmission characteristic (or quality) between nodes. The transmission characteristic is specified, for example, by a Signal-to-Noise Ratio (SNR) monitored in an optical transmission device on a receiver side. Stated another way, a transmission characteristic monitor 3 monitors an SNR of the DMT modulated optical signal received from the optical transmitter 1. In this case, the transmission characteristic monitor 3 monitors an SNR of each of the subcarriers.

Figure 2B:
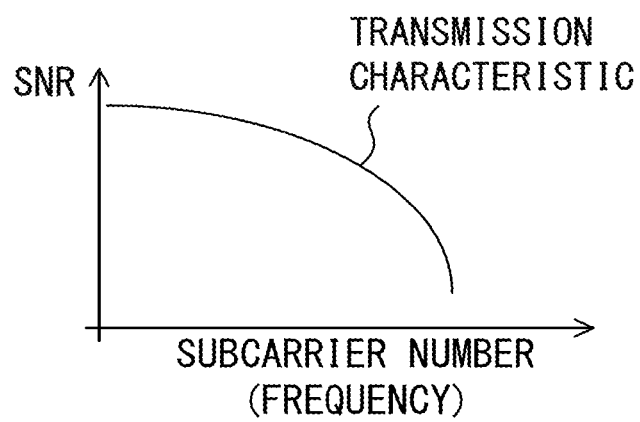

FIG. 2B illustrates an example of a transmission characteristic measured by the transmission characteristic monitor 3. A horizontal axis represents a subcarrier number (1 to N) for identifying each of the subcarriers. A vertical axis represents an SNR. In this example, a transmission characteristic is good in a frequency range having a small subcarrier number, and the transmission characteristic deteriorates in a frequency range having a large subcarrier number. In the description below, assume that, as a subcarrier number becomes smaller, a frequency becomes lower, and that, as a subcarrier number becomes larger, a frequency becomes higher. Namely, in this example, as the frequency of a subcarrier becomes lower, an SNR becomes higher, and as the frequency of a subcarrier becomes higher, an SNR becomes lower.

Figure 2C:
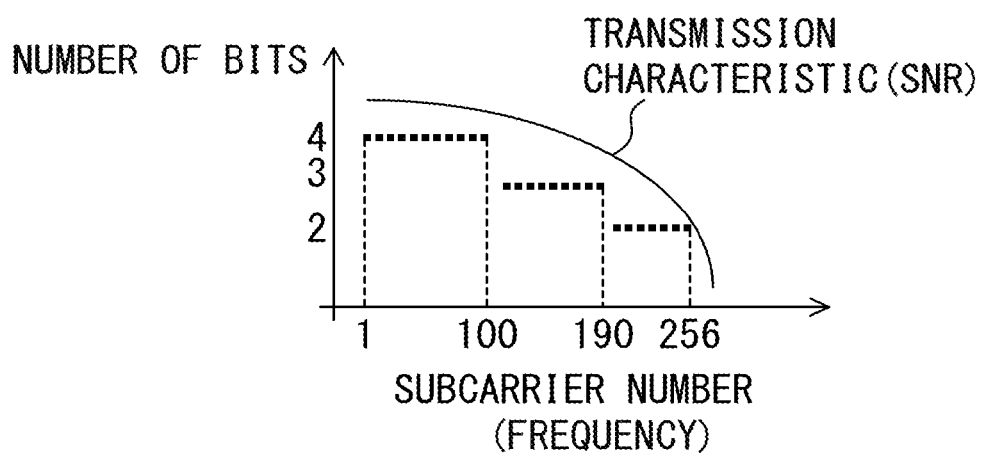

A bit allocator 4 determines bit allocation according to the transmission characteristic measured by the transmission characteristic monitor 3. Stated another way, the number of bits to be transmitted in one symbol is determined for each of the subcarriers. A large number of bits are allocated to a subcarrier having a high SNR, and a small number of bits are allocated to a subcarrier having a low SNR. In the example illustrated in FIG. 2C, a DMT modulated optical signal transmits data by using 256 subcarriers. 4 bits are allocated to each of the subcarriers 1-100, 3 bits are allocated to each of the subcarriers 101-190, and 2 bits are allocated to each of the subcarriers 191-256.

A transmission circuit controller 5 specifies a modulation format of each of the subcarriers according to the bit allocation determined by the bit allocator 4. As an example, QPSK modulation is specified for subcarriers to which 2 bits are allocated. 8PSK modulation is specified for subcarriers to which 3 bits are allocated. 16QAM modulation is specified for subcarriers to which 4 bits are allocated. Then, the DMT modulator 1a modulates the respective subcarriers according to the modulation formats specified by the transmission circuit controller 5.

In the configuration illustrated in FIG. 1, the optical transmitter 1 and the transmission circuit controller 5 are provided in a transmission device on a transmitter side, and the optical receiver 2, the transmission characteristic monitor 3, and the bit allocator 4 are provided in a transmission device on a receiver side. The embodiments do not always need to have the configuration above. As an example, the bit allocator 4 may be provided in the transmission device on the transmitter side. In this case, a measurement result of the transmission characteristic monitor 3 is reported from the transmission device on the receiver side to the transmission device on the transmitter side.

FIG. 3 illustrates a procedure of DMT negotiation. DMT negotiation includes stages 1-3 described below, and DMT negotiation is performed between a DMT transmitter and a DMT receiver. The DMT transmitter corresponds to the optical transmitter 1 or the DMT modulator 1b illustrated in FIG. 1. The DMT receiver corresponds to the optical receiver 2 or the DMT demodulator 2c illustrated in FIG. 1.

At stage 1, the DMT transmitter transmits a pilot signal for synchronization to the DMT receiver. In response to the pilot signal for synchronization, synchronization is established between the DMT transmitter and the DMT receiver.

At stage 2, the DMT transmitter transmits a probe signal to the DMT receiver. The DMT receiver includes an equalizer that equalizes a received signal. The equalizer is implemented by a digital filter. The DMT receiver calculates a parameter of the equalizer (for example, a tap coefficient of the digital filter) according to the received probe signal. The calculated parameter is given to the equalizer. The operation of stage 2 is performed on each of the subcarriers. Accordingly, as an example, when a DMT modulated optical signal includes 256 subcarriers, an operation to transmit a probe signal and an operation to calculate an equalizer parameter are performed 256 times.

At stage 3, the DMT transmitter transmits a probe signal to the DMT receiver. The DMT receiver measures a Signal-to-Noise Ratio (SNR) by using the probe signal. The operation of stage 3 is also performed on each of the subcarriers. Accordingly, as an example, when a DMT modulated optical signal includes 256 subcarriers, an operation to transit a probe signal and an operation to measure an SNR are performed 256 times. The DMT receiver calculates the number of bits to be allocated to each of the subcarriers according to the SNR measured for each of the subcarriers. Namely, bit allocation of the DMT modulated optical signal is determined.

The DMT receiver transmits, to the DMT transmitter, bit allocation information indicating the bit allocation. Then, the DMT transmitter configures a transmission circuit according to the bit allocation information. As an example, the DMT transmitter controls the operation states of a data distribution circuit that distributes input data to a plurality of subcarriers and a modulator that modulates the respective subcarriers, according to the bit allocation information. Then, the DMT transmitter starts to transmit data.

As described above, the operations at stages 2 and 3 of DMT negotiation are repeatedly performed as many times as the number of subcarriers included in a DMT modulated optical signal. Therefore, the time needed to perform DMT negotiation may increase. Accordingly, the optical transmission system according to the embodiments performs a bit allocation method for reducing a DMT negotiation time.

First Embodiment

Figure 4:
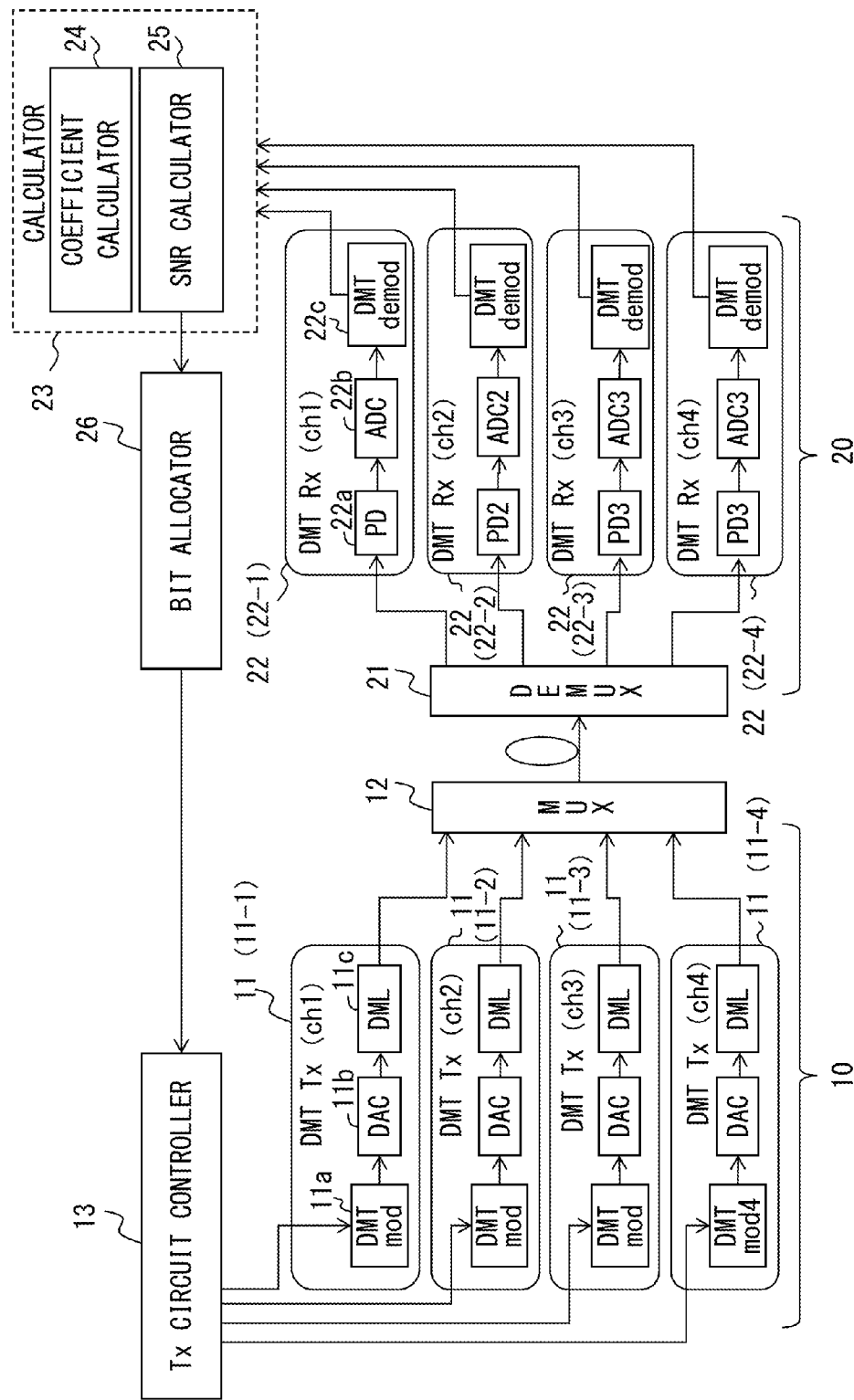
FIG. 4 illustrates an example of an optical transmission system according to a first embodiment.

FIG. 4 illustrates an example of an optical transmission system according to a first embodiment. The optical transmission system according to the first embodiment includes an optical transmission device 10 that is provided on a transmitter side and an optical transmission device 20 that is provided on a receiver side. An optical fiber transmission line is provided between the optical transmission devices 10 and 20. One or more optical amplifiers may be provided on the optical fiber transmission line.

The optical transmission device 10 includes a plurality of DMT transmitters 11, a multiplexer (MUX) 12, and a transmission circuit controller 13. In this example, the optical transmission device 10 includes four DMT transmitters (11-1 to 11-4).

Each of the DMT transmitters 11 includes a DMT modulator (DMT mod) 11a, a D/A converter (DAC) 11b, and an E/O device (DML) 11c. The DMT modulator 11a generates a DMT modulated signal from input data. The input data is divided and allocated to a plurality of subcarriers. The plurality of subcarriers have frequencies different from each other, as illustrated in FIG. 2A. In this example, each of the DMT transmitters 11 generates a DMT modulated optical signal by using 256 subcarriers. The D/A converter 11b converts the DMT modulated signal generated by the DMT modulator 11a into an analog signal. The E/O device 11c generates a DMT modulated optical signal from the analog DMT modulated signal. As described above, each of the DMT transmitters 11 generates a DMT modulated optical signal from input data.

The DMT transmitters 11-1 to 11-4 respectively transmit DMT modulated optical signals by using wavelength channels ch1-ch4 that are arranged within a band of 1.3 μm. The wavelengths of the wavelength channels ch1, ch2, ch3, and ch4 are respectively 1296 nm, 1300 nm, 1305 nm, and 1309 nm in this example. Each of the DMT modulated optical signals includes 256 subcarriers. Namely, the numbers of subcarriers that are respectively included in the DMT modulated optical signals in the respective wavelength channels are the same as each other. In addition, the frequency ranges of the subcarriers in the respective wavelength channels are the same as each other. Further, in the description below,
assume that the transmission capacities of the DMT transmitters 11-1 to 11-4 are the same as each other. Note that the DMT transmitters 11-1 to 11-4 may transmit DMT modulated optical signals within another wavelength band.

The multiplexer 12 multiplexes the DMT modulated optical signals generated by the DMT transmitters 11-1 to 11-4 so as to generate a WDM optical signal. The WDM optical signal is transmitted via an optical transmission line, and is received by the optical transmission device 20. The transmission circuit controller 13 controls the operation state of the DMT modulator 11a in each of the DMT transmitters 11 in accordance with the bit allocation information given from a bit allocator 26. The transmission circuit controller 13 is implemented, for example, by a processor system including a processor and a memory. Some functions of the transmission circuit controller 13 may be implemented by a hardware circuit.

Figure 5:
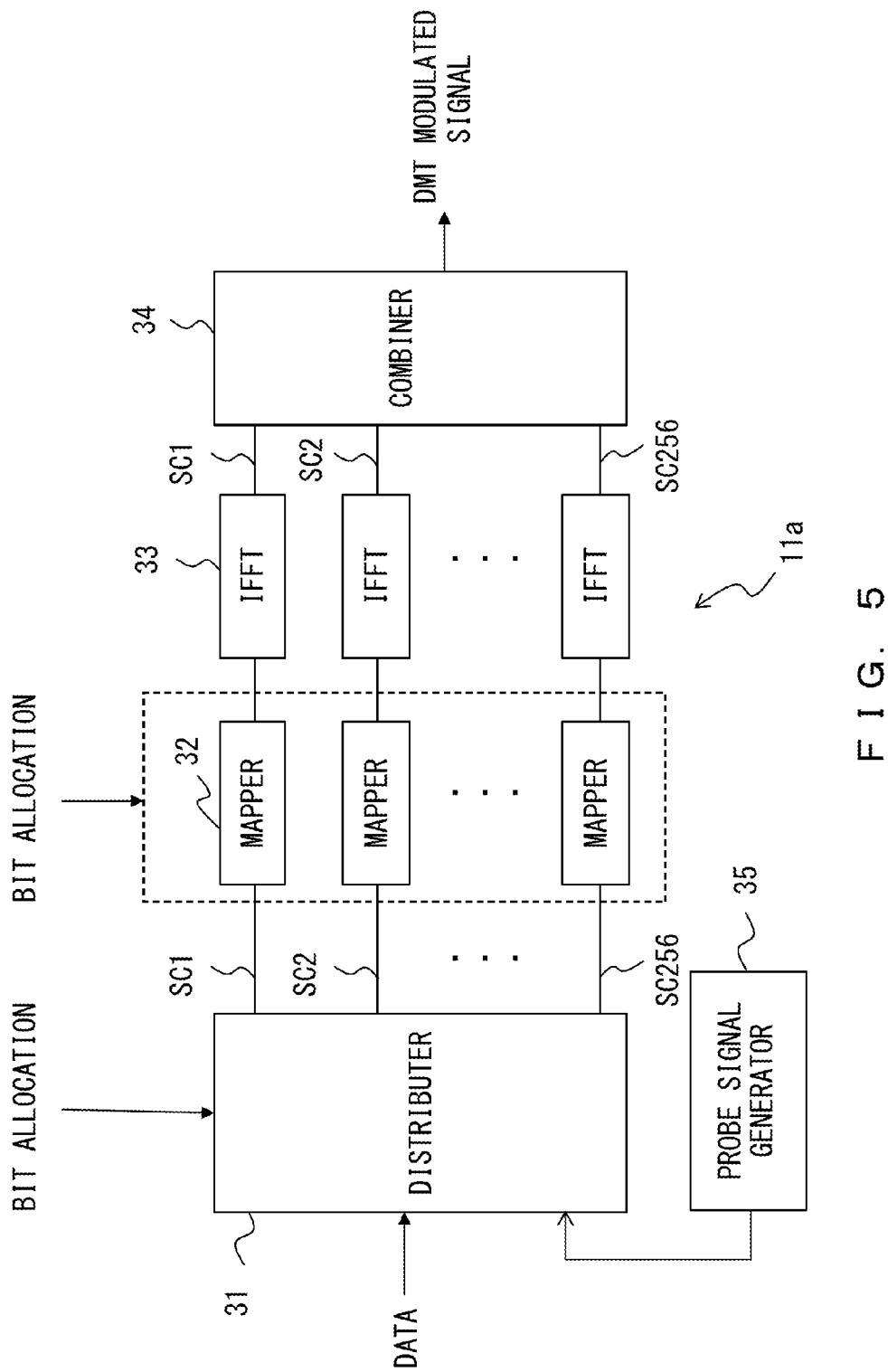
FIG. 5 illustrates an example of a DMT modulator.

FIG. 5 illustrates an example of the DMT modulator 11a. The DMT modulator 11a includes a distributer 31, a mapper 32, an IFFT circuit 33, a combiner 34, and a probe signal generator 35. The DMT modulator 11a may include other circuit elements.

The distributer 31 allocates input data to a plurality of subcarriers according to a bit allocation instruction. The bit allocation instruction is generated according to the bit allocation information by the transmission circuit controller 13. The bit allocation instruction specifies the number of bits to be allocated to each of the subcarriers. As an example, assume that 4 bits are allocated to the subcarrier SC1, and that 2 bits are allocated to the subcarrier SC256. In this case, the distributer 31 gives 4 bits of data to the subcarrier SC1, and gives 2 bits of data to the subcarrier SC256 in each symbol.

The mapper 32 is provided for each of the subcarriers. Accordingly, in this example, the DMT modulator 11a includes 256 mappers 32. Each of the mappers 32 maps an input signal on a constellation according to a bit allocation instruction. Namely, the input signal is converted into an electric field information signal indicating a phase and an amplitude. The bit allocation instruction is given from the transmission circuit controller 13. The bit allocation instruction substantially specifies a modulation format (such as BPSK, QPSK, 8PSK, 16QAM, or 32QAM). As an example, assume that "4 bits: 16QAM" is specified for the subcarrier SC1, and that "2 bits: QPSK" is specified for the subcarrier SC256. In this case, the mapper 32 that corresponds to the subcarrier SC1 converts given 4 bits of data into a 16QAM signal, and the mapper 32 that corresponds to the subcarrier SC256 converts given 2 bits of data into a QPSK signal.

The IFFT circuit 33 converts the electric field information signal output from the mapper 32 into a time domain signal. Namely, time domain signals that respectively correspond to the subcarriers SC1-SC256 are generated. The combiner 34 combines the time domain signals output from the IFFT circuit 33 so as to generate a DMT modulated signal.

The probe signal generator 35 generates a probe signal when DMT negotiation is performed. The probe signal indicates a data pattern that has been specified in advance. The generated probe signal is given to the distributer 31. When DMT negotiation is performed, the distributer 31 allocates the probe signal to a specified subcarrier. In this case, other subcarriers transmit, for example, random signals.

The optical transmission device 20 includes a demultiplexer (DEMUX) 21, a plurality of DMT receivers 22, a calculator 23, and a bit allocator 26. In this example, the optical transmission device 20 includes four DMT receivers 22 (22-1 to 22-4).

The demultiplexer 21 demultiplexes a received WDM optical signal into signals for respective wavelength channels. In this example, signals for the wavelength channels ch1-ch4 are demultiplexed. The DMT receivers 22-1 to 22-4 respectively receive DMT modulated optical signals via the wavelength channels ch1-ch4.

Each of the DMT receivers 22 includes a photodetector (PD) 22a, an A/D converter (ADC) 22b, and a DMT demodulator (DMT demod) 22c. The photodetector 22a converts the received DMT modulated optical signal into an electric signal. The A/D converter 22b converts a signal output from the photodetector 22a into a digital signal. The DMT demodulator 22c performs DMT demodulation on the digital signal output from the A/D converter 22b so as to recover data.

Figure 6:
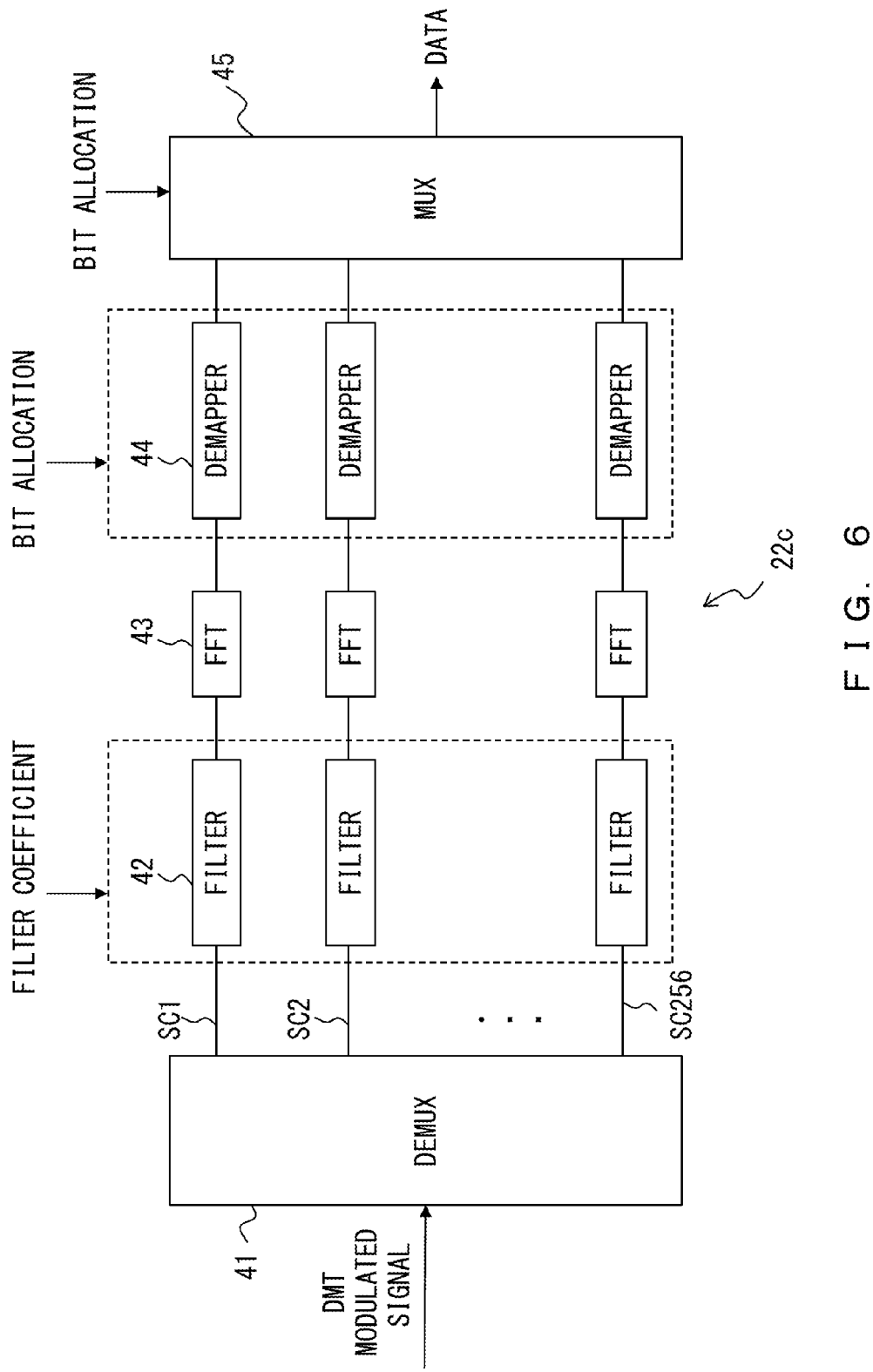
FIG. 6 illustrates an example of a DMT demodulator.

FIG. 6 illustrates an example of the DMT demodulator 22c. The DMT demodulator 22c includes a demultiplexer 41, filters 42, an FFT circuit 43, demappers 44, and a multiplexer 45. The DMT demodulator 22c may include other circuit elements.

The demultiplexer 41 demultiplexes a received DMT modulated signal into signals for respective subcarriers. Namely, received signals of the respective subcarriers are guided to corresponding filters 42. The filters 42 are provided for the respective subcarriers. Accordingly, in this example, the DMT demodulator 22c includes 256 filters 42. Each of the filters 42 equalizes the power and/or phase of a received signal. The filer 42 is implemented by a digital filter such as an FIR filter. Therefore, the equalization characteristic of the filter 42 is controlled according to given filter coefficients (or tap coefficients). The filter coefficients are given from a coefficient calculator 24 described below.

The FFT circuit 43 converts the received signal equalized by the filter 42 into a frequency domain signal. Each of the frequency domain signals indicates electric field information of a corresponding subcarrier. The demapper 44 recovers data from a corresponding frequency domain signal. The demapper 44 performs a process inverse to the process of corresponding mapper 32 illustrated in FIG. 5. The multiplexer 45 multiplexes data signals of the respective subcarriers.

Return now to FIG. 4. The calculator 23 calculates a transmission characteristic of a DMT signal according to data recovered by each of the DMT receivers 22. In this example, the calculator 23 includes a coefficient calculator 24 and an SNR calculator 25. The calculator 23 is implemented, for example, by a processor system including a processor and a memory. Some functions of the calculator 23 may be implemented by a hardware circuit.

The coefficient calculator 24 calculates filter coefficients for appropriately equalizing a received signal for each of the subcarriers. The coefficient calculator 24 calculates the filter coefficients at stage 2 in the DMT negotiation illustrated in FIG. 3. The calculated filter coefficients are given to a corresponding filter 42 illustrated in FIG. 6. The SNR calculator 25 calculates an SNR of a received signal for each of the subcarriers. The SNR calculator 25 calculates the SNR at stage 3 of the DMT negotiation illustrated in FIG. 3.

The bit allocator 26 determines the number of bits to be allocated to each of the subcarriers according to the SNR of each of the subcarriers that has been calculated by the SNR calculator 25. The bit allocator 26 may calculate bit/power allocation. In the description below, the bit allocator 26 is assumed to simply determine the number of bits to be allocated to each of the subcarriers, for a concise explanation.

The bit allocator 26 is implemented, for example, by a processor system including a processor and a memory. Some functions of the bit allocator 26 may be implemented by a hardware circuit. When the bit allocator 26 is provided in the optical transmission device 20, the calculator 23 and the bit allocator 26 may be implemented by one processor system.

The bit allocator 26 transmits, to the transmission circuit controller 13, bit allocation information indicating the number of bits to be allocated to each of the subcarriers. The transmission circuit controller 13 controls the operation state of the DMT modulator 11a in each of the DMT transmitters 11 in accordance with the bit allocation information.

Figure 7:
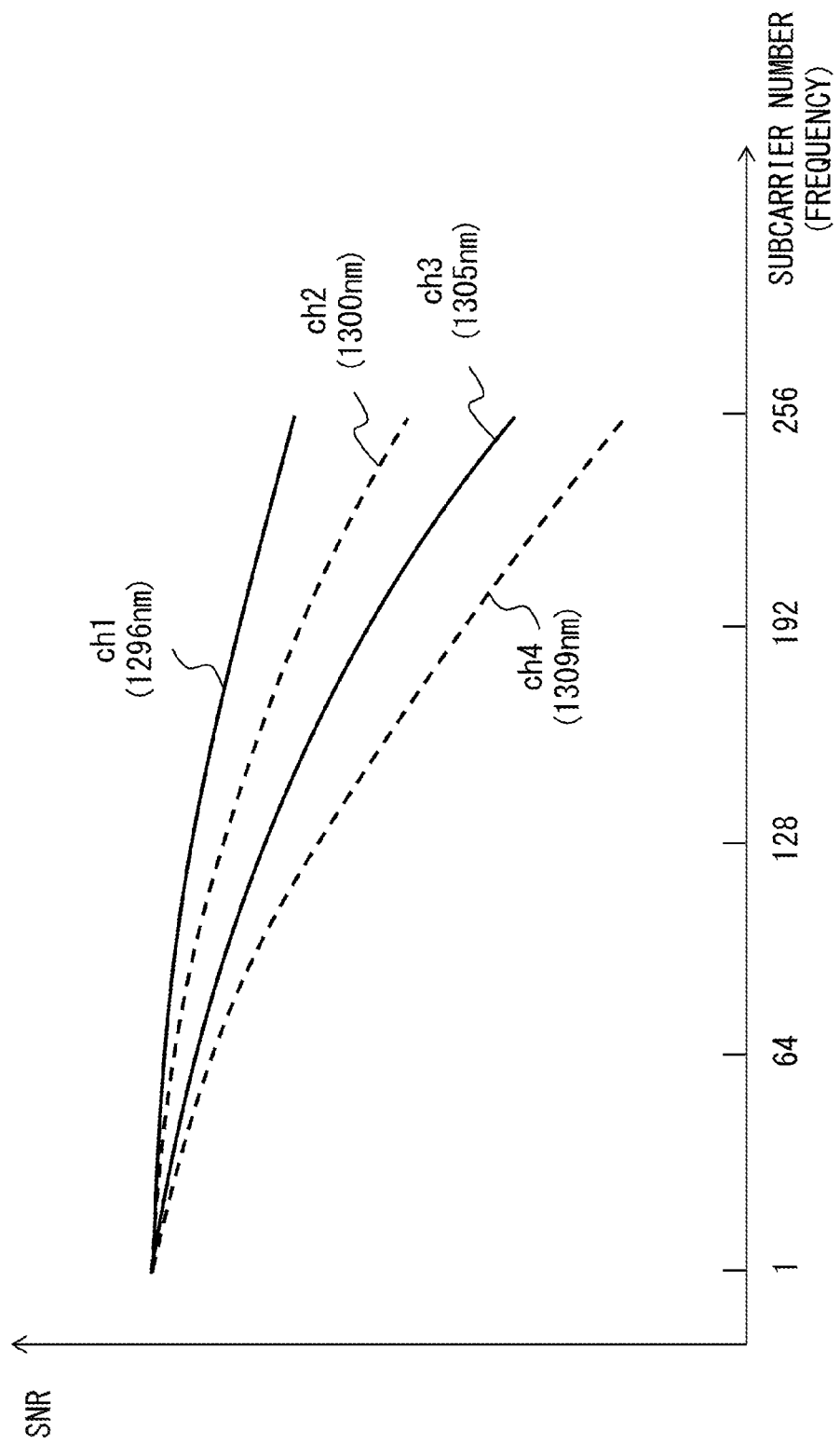
FIG. 7 illustrates an SNR characteristic with respect to a wavelength and a frequency.

FIG. 7 illustrates an SNR characteristic with respect to a wavelength and a frequency. ch1-ch4 represent wavelength channels that DMT modulated optical signals generated by the DMT transmitters 11-1 to 11-4 illustrated in FIG. 4 are transmitted through. Accordingly, among the wavelength channels ch1-ch4, the wavelength channel ch1 has the shortest wavelength, and the wavelength channel ch4 has the longest wavelength. Each of the DMT modulated optical signals includes 256 subcarriers SC1-SC256. As described above, among the subcarriers SC1-SC256, the subcarrier SC1 has the lowest frequency, and the subcarrier SC256 has the highest frequency.

As illustrated in FIG. 7, in a wavelength band of 1.3 µm, as a wavelength becomes longer, an SNR decreases. Specifically, an SNR decreases in the order of the wavelength channels ch1 to ch4. In addition, as a subcarrier has a higher frequency, an SNR decreases. Specifically, an SNR decreases almost in the order of the subcarrier SC1 to the subcarrier SC256. Further, in an frequency range in which a subcarrier has a low frequency, a difference in an SNR characteristic between wavelength channels is small, but in an frequency range in which a subcarrier has a high frequency, the difference in the SNR characteristic between wavelength channels is large. Deterioration of an SNR principally results from chromatic dispersion.

The SNR characteristics illustrated in FIG. 7 are obtained by sequentially performing the operation of stage 3 of DMT negotiation on all of the subcarriers SC1-SC256 in the respective wavelength channels ch1-ch4. In this case, an SNR needs to be measured 256 times in the respective wavelength channels. Namely, the time needed to perform DMT negotiation may increase. Accordingly, in the optical transmission system according to the first embodiment, a bit allocation method that enables a DMT negotiation time to be reduced is performed.

Figure 8:
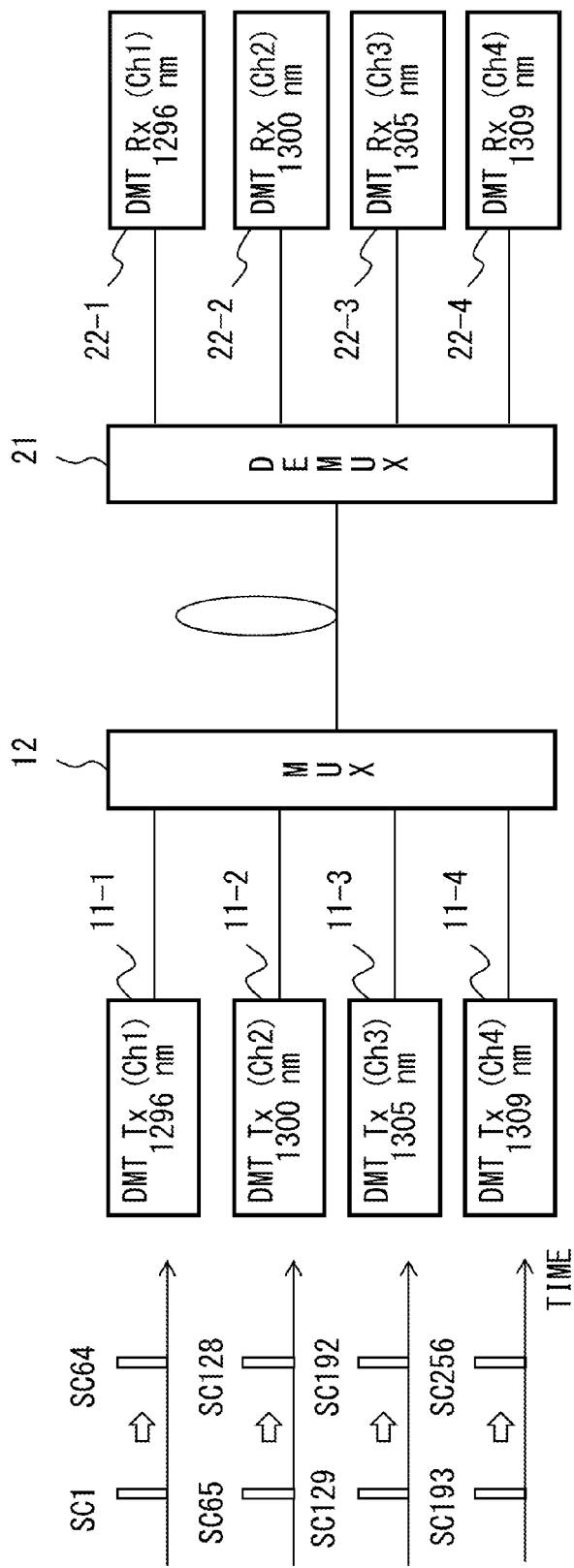
FIG. 8 illustrates an example of DMT negotiation according to the first embodiment.

FIG. 8 illustrates an example of DMT negotiation according to the first embodiment. In DMT negotiation according to the first embodiment, the respective wavelength channels have different frequency ranges of subcarriers to transmit probe signals. In this example, probe signals of the subcarriers SC1-SC64 are sequentially transmitted through the wavelength channel ch1, probe signals of the subcarriers SC65-SC128 are sequentially transmitted through the wavelength channel ch2, probe signals of the subcarriers SC129-SC192 are sequentially transmitted through the wavelength channel ch3, and probe signals of the subcarriers SC193-SC256 are sequentially transmitted through the wavelength channel ch4.

As an example, the operation of stage 3 of DMT negotiation is performed in the following procedures. First, SNRs of the subcarriers SC1, SC65, SC129, and SC193 are measured in the respective wavelength channels ch1, ch2, ch3, and ch4. At this time, probe signals are transmitted in parallel thorough four wavelength channels ch1-ch4, and SNRs are measured in parallel. Then, SNRs of the subcarriers SC2, SC66, SC130 and SC194 are measured in the respective wavelength channels ch1, ch2, ch3, and ch4. Similarly, subcarriers are sequentially selected in the respective wavelength channels ch1-ch4, and SNRs are measured. Finally, SNRs of the subcarriers SC64, SC128, SC192, and SC256 are measured in the respective wavelength channels ch1, ch2, ch3, and ch4.

Figure 9:
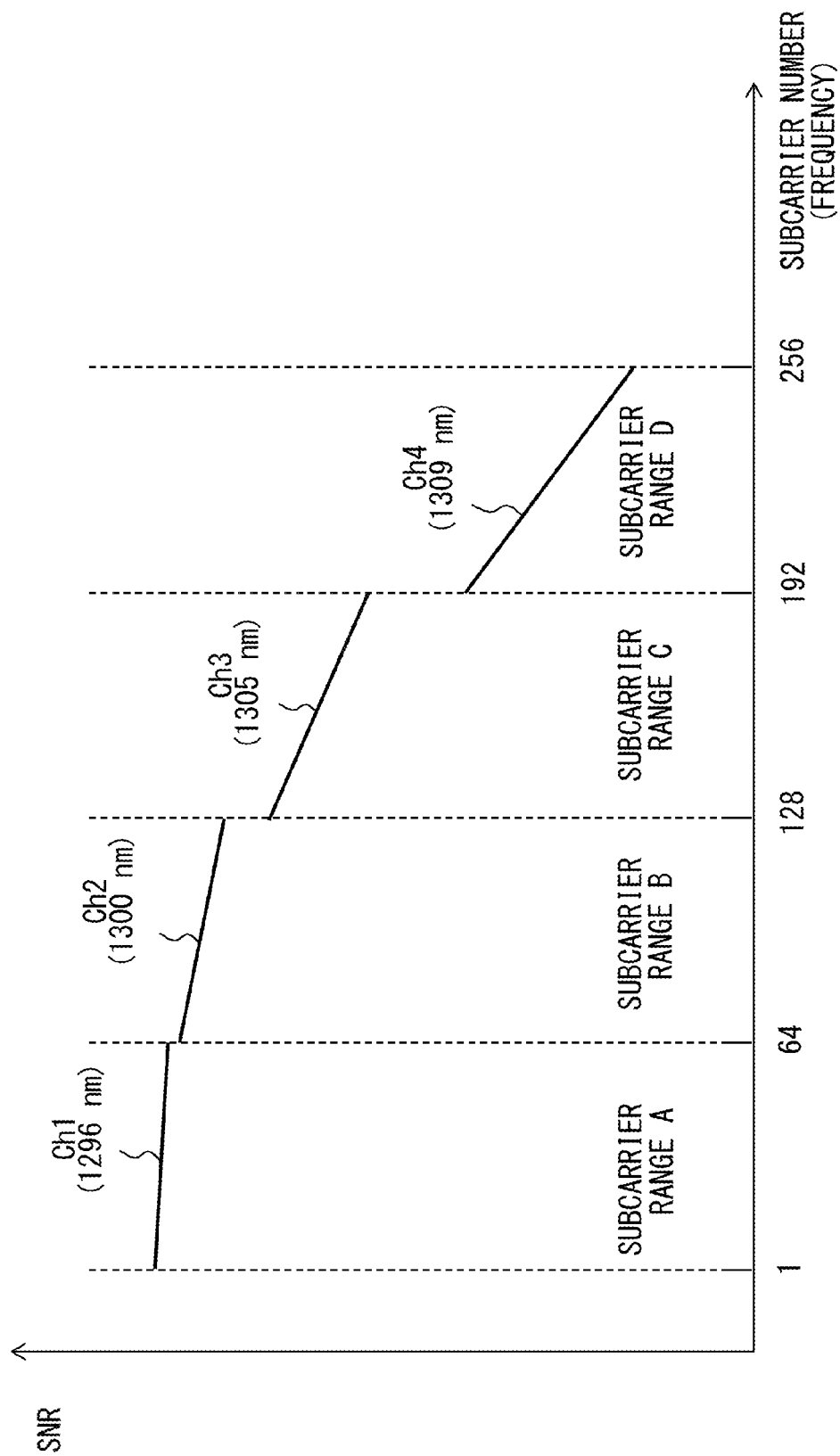
FIG. 9 illustrates SNR characteristics obtained in DMT negotiation according to the first embodiment.

FIG. 9 illustrates SNR characteristics obtained in DMT negotiation according to the first embodiment. According to the first embodiment, SNRs are measured within different subcarrier frequency ranges for the respective wavelength channels. Namely, respective SNRs of subcarriers that belong to a subcarrier range A (SC1-SC64) are measured in the wavelength channel ch1, respective SNRs of subcarriers that belong to a subcarrier range B (SC65-SC128) are measured in the wavelength channel ch2, respective SNRs of subcarriers that belong to a subcarrier range C (SC129-SC192) are measured in the wavelength channel ch3, and respective SNRs of subcarriers that belong to a subcarrier range D (SC193-SC256) are measured in the wavelength channel ch4. In other words, an SNR characteristic of the subcarrier range A (SC1-SC64) is obtained by using the wavelength channel ch1, an SNR characteristic of the subcarrier range B (SC65-SC128) is obtained by using the wavelength channel ch2, an SNR characteristic of the subcarrier range C (SC129-SC192) is obtained by using the wavelength channel ch3, and an SNR characteristic of the subcarrier range D (SC193-SC256) is obtained by using the wavelength channel ch4.

A wavelength channel used to measure an SNR within each of the subcarrier frequency ranges is determined, for example, according to a difference in the SNR characteristic between wavelength channels. In this example, a wavelength channel having a low SNR is selected within a subcarrier frequency range having a large difference in the SNR characteristic between wavelength channels, and a wavelength channel having a high SNR is selected within a subcarrier frequency range having a small difference in the SNR characteristic between wavelength channels. Assume that the tendency of an SNR characteristic with respect to the wavelength of an optical signal and the frequency of a subcarrier is known. In a band of 1.3 µm, as an optical signal has a longer wavelength, an SNR decreases, and as a subcarrier has a higher frequency, an SNR decreases, as illustrated in FIG. 7. Accordingly, when the tendency above is known, a difference in the SNR characteristic between wavelength channels can be estimated for respective subcarrier frequency ranges.

As an example, as illustrated in FIG. 7, a difference in the SNR characteristic between wavelength channels is large in an area in which a subcarrier has a high frequency (namely, an area having a large subcarrier number). Compared with a wavelength channel having a short wavelength, an SNR of a wavelength channel having a long wavelength deteriorates. Accordingly, the SNR characteristic of the wavelength channel ch4 is measured within the subcarrier range D. Stated another way, the SNR characteristic of the subcarrier range D is measured by using the wavelength channel ch4. On the other hand, in a range in which a subcarrier has a low frequency (namely, an area having a small subcarrier number), a difference in the SNR characteristic between wavelength channels is small. In addition, compared with a wavelength channel having a long wavelength, an SNR of a wavelength channel having a short wavelength is high.

Accordingly, the SNR characteristic of the wavelength channel ch1 is measured within the subcarrier range A. Stated another way, the SNR characteristic of the subcarrier range A is measured by using the wavelength channel 1. Wavelength channels used to measure the SNR characteristic within the subcarrier ranges B and C are determined according to a similar policy.

The SNR characteristics above are measured by the SNR calculator 25 illustrated in FIG. 4. The SNR calculator 25 connects the SNR characteristics measured in the respective wavelength channels ch1-ch4 so as to generate a common SNR characteristic. The bit allocator 26 determines bit allocation indicating the number of bits to be allocated to each of the subcarriers in accordance with the common SNR characteristic generated by the SNR calculator 25. The bit allocation is shared by the wavelength channels ch1-ch4.

The bit allocator 26 determines bit allocation shared by the wavelength channels ch1-ch4 in accordance with the SNR characteristics illustrated in FIG. 9 (namely, the common SNR characteristic). Specifically, the bit allocator 26 determines bit allocation shared by the wavelength channels ch1-ch4 in accordance with an SNR characteristic obtained from the wavelength channel ch1 within the subcarrier range A, an SNR characteristic obtained from the wavelength channel ch2 within the subcarrier range B, an SNR characteristic obtained from the wavelength channel ch3 within the subcarrier range C, and an SNR characteristic obtained from the wavelength channel ch4 within the subcarrier range D. As a method for determining the number of bits to be allocated to each of the subcarriers in accordance with SNR characteristics, a known algorithm can be used.

FIGS. 10A and 10B illustrate an example of a method for determining bit allocation according to SNR characteristics. For a simple explanation, assume that a DMT modulated optical signal includes eight subcarriers SC1-SC8. Also assume that an SNR characteristic A has been obtained as a result of measurement. SNR_BPSK, SNR_QPSK, SNR_8PSK, and SNR_16QAM respectively represent allowable SNRs of BPSK, QPSK, 8PSK, and 16QAM. The allowable SNR corresponds to a threshold that assures that a bit error rate satisfies a specified condition or request.

In a bit allocation algorithm, a bit is allocated, for example, to a subcarrier having the largest SNR margin. SNR margins of respective subcarriers are calculated, for example, in the following method.

Subcarrier to which no bits have been allocated: a difference between a measured SNR and SNR_BPSK Subcarrier to which 1 bit has been allocated: a difference between a measured SNR and SNR_QPSK Subcarrier to which 2 bits have been allocated: a difference between a measured SNR and SNR_8PSK Subcarrier to which 3 bits have been allocated: a difference between a measured SNR and SNR_16QAM Accordingly, in allocating a first bit, an SNR margin of each of the subcarriers is calculated by calculating a difference between an SNR of each of the subcarriers and SNR_BPSK. The first bit is allocated to a subcarrier having the largest SNR margin. In this example, an SNR margin of the subcarrier SC1 is the largest, and therefore the first bit is allocated to the subcarrier SC1.

In allocating a second bit, an SNR margin of the subcarrier SC1 is a difference between an SNR of the subcarrier SC1 and SNR_QPSK. SNR margins of the subcarriers SC2-SC8 are respectively differences between corresponding SNRs and SNR_BPSK. The second bit is allocated to a subcarrier having the largest SNR margin. As an example, assume that the SNR margin of the subcarrier SC2 is the largest. In this case, the second bit is allocated to the subcarrier SC2.

Similarly, in the bit allocation algorithm, bits are sequentially allocated to subcarriers having a large SNR margin. When a specified number of bits are allocated to subcarriers, processing according to the bit allocation algorithm is terminated.

In the optical transmission system according to the first embodiment, a subcarrier frequency range of a DMT modulated signal is divided into a plurality of frequency ranges, and the transmission characteristics of subcarriers included in a multicarrier signal that correspond to respective divided subcarrier frequency ranges are measured within the respective divided subcarrier frequency ranges. In the example illustrated in FIG. 10B, a subcarrier frequency range of a DMT modulated signal is divided into a subcarrier range A1 and a subcarrier range A2. Within the subcarrier range A1, SNRs of the subcarriers SC1-SC4 included in a DMT modulated optical signal 1 are measured. Within the subcarrier range A2, SNRs of the subcarriers SC5-SC8 included in a DMT modulated optical signal 2 are measured. Consequently, an SNR characteristic A1 is assumed to be obtained in the subcarrier range A1, and an SNR characteristic A2 is assumed to be obtained in the subcarrier range A2. In the example illustrated in FIG. 10B, assume that data to be allocated to subcarriers SC1-SC8 is 12 bits per symbol.

The bit allocator 26 performs bit allocation according to a common SNR characteristic generated by connecting the SNR characteristic A1 and the SNR characteristic A2. Measurement of respective SNR characteristics and generation of a common SNR characteristic are performed by the SNR calculator 25, as described above.

The bit allocator 26 performs bit allocation according to SNR margins of respective subcarriers, as described above with reference to FIG. 10A. In this case, SNR margins of the subcarriers SC1-SC4 are calculated according to the SNR characteristic A1 measured by using the DMT modulated optical signal 1. SNR margins of the subcarriers SC5-SC8 are calculated according to the SNR characteristic A2 measured by using the DMT modulated optical signal 2.

In allocating the first bit, an SNR margin of the subcarrier SC1 (a difference between an SNR of the subcarrier SC1 and SNR_BPSK) is the largest. Accordingly, the first bit is allocated to the subcarrier SC1. Then, the SNR margin of the subcarrier SC1 is updated to the "difference between the SNR of the subcarrier SC1 and SNR_QPSK".

In allocating the second bit, an SNR margin of the subcarrier SC2 (a difference between an SNR of the subcarrier SC2 and SNR_BPSK) is the largest. Accordingly, the second bit is allocated to the subcarrier SC2. Then, the SNR margin of the subcarrier SC2 is updated to the "difference between the SNR of the subcarrier SC2 and SNR_QPSK".

Similarly, the third bit to the 12th bits are respectively allocated to subcarriers having the largest SNR margins. Consequently, in the example illustrated in FIG. 10B, 3 bits are allocated to each of the subcarriers SC1 and SC2, 2 bits are allocated to each of the subcarriers SC3 and SC4, and 1 bit is allocated to each of the subcarriers SC5 and SC6. No bits are allocated to the subcarriers SC7 and SC8.

The bit allocation algorithm illustrated in FIGS. 10A and 10B is an example of a bit allocation method, and the present invention or the first embodiment of the present invention is not limited to this algorithm. Namely, according to the present invention or the first embodiment of the present invention, bit allocation or bit loading can be performed according to SNR characteristics in any other algorithm.

As described above, according to the first embodiment, a common SNR characteristic is generated for a plurality of wavelength channels ch1-ch4, and common bit allocation is determined for the respective wavelength channels ch1-ch4 according to the common SNR characteristic. The DMT transmitters 11-1 to 11-4 respectively generate DMT modulated optical signals according to the common bit allocation. The common SNR characteristic generated according to the first embodiment has an error with respect to an actually measured SNR characteristic. Accordingly, compared with a scheme for determining bit allocation in accordance with a result of measuring SNRs of all of the subcarriers, the transmission characteristics of respective DMT modulated optical signals generated according to the first embodiment may deteriorate.

Figure 11A:
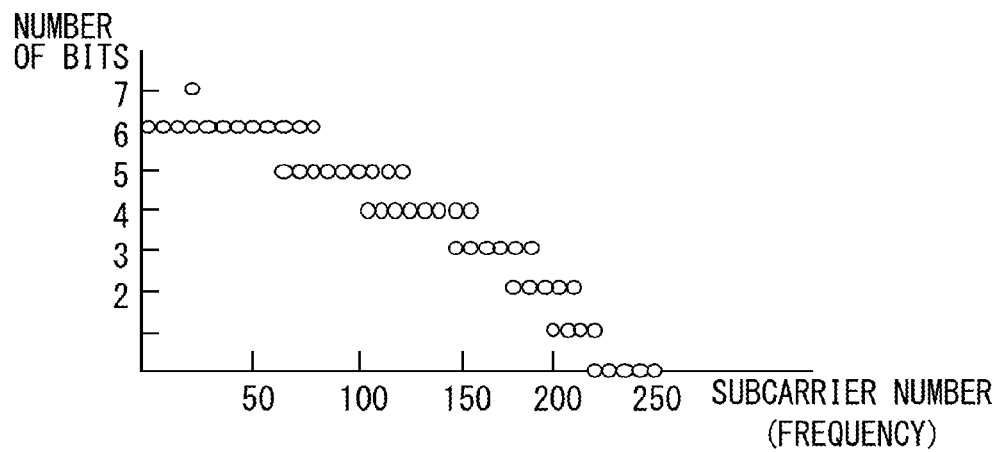
FIGS. 11A-11C schematically illustrate examples of bit allocation.
Figure 11B:
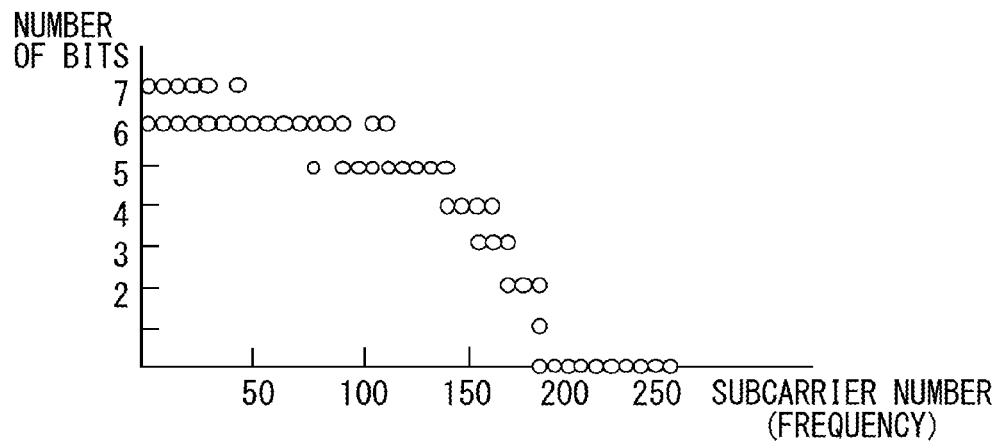

In this specification, the procedure for measuring SNRs of all of the subcarriers in respective wavelength channels and determining bit allocation in accordance with the measurement result may be referred to as an "all-subcarrier measurement scheme". In the all-subcarrier measurement scheme, bit allocation is calculated for the respective wavelength channels ch1-ch4 in accordance with the SNR characteristics illustrated in FIG. 7 that respectively correspond to the wavelength channels ch1-ch4. Accordingly, in the all-subcarrier measurement scheme, bit allocation may be different between the wavelength channels ch1-ch4. FIG. 11A illustrates an example of bit allocation determined for the wavelength channel ch1 in the all-subcarrier measurement scheme. FIG. 11B illustrates an example of bit allocation determined for the wavelength channel ch4 in the all-subcarrier measurement scheme.

Figure 11C:
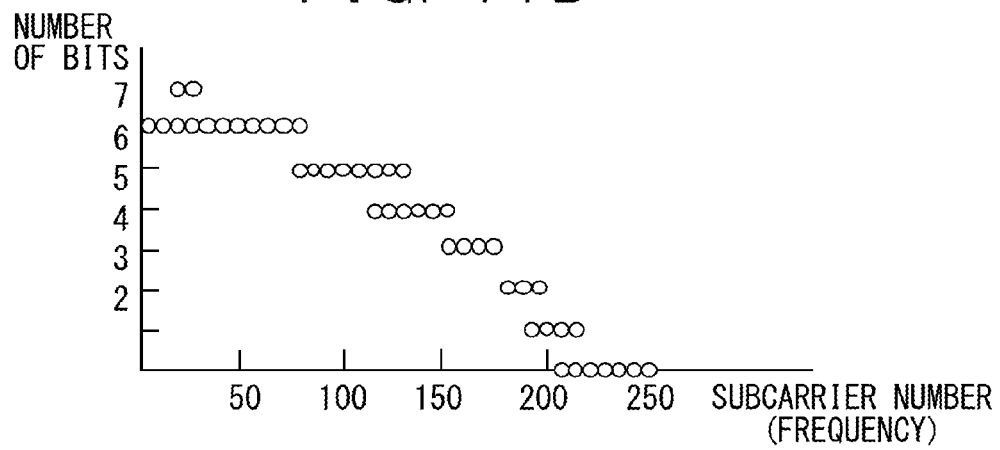

In contrast, according to the first embodiment, the same bit allocation is determined for the wavelength channels ch1-ch4. FIG. 11C illustrates an example of bit allocation determined according to the first embodiment.

FIG. 12 illustrates transmission characteristics of DMT modulated optical signals generated according to the all-subcarrier measurement scheme and the first embodiment. FIG. 12 illustrates bit error rates of DMT modulated optical signals in respective wavelength channels. An FEC limit represents a maximum value of a bit error rate that can be corrected by using an FEC (Forward Error Correction) code when a specified FEC code has been given to data transmitted in a DMT modulated optical signal.

When DMT modulated optical signals are generated according to the all-subcarrier measurement scheme, bit error rates of the wavelength channels ch3 and ch4 having a long wavelength are greater than those of the wavelength channels ch1 and ch2 having a short wavelength. When respective transmission capacities of the wavelength channels ch1-ch4 are the same as each other, and are fixed, a wavelength channel having low SNRs in respective subcarriers (namely, the wavelength channels ch3 and ch4) has a higher bit error rate.

When DMT modulated optical signals are generated according to the first embodiment, bit error rates are higher compared with the all-subcarrier measurement scheme. When common bit allocation is determined according to the first embodiment, an SNR characteristic of a wavelength channel having a low SNR (namely, the wavelength channel ch4) is used in a subcarrier frequency range having a large difference in the SNR characteristic between wavelength channels (namely, the subcarrier range D). Stated another way, bit allocation is performed according to an actually measured SNR characteristic in the wavelength channel ch4 having a poor transmission characteristic. Accordingly, in the wavelength channel ch4, a bit allocation error is small, and a transmission characteristic does not deteriorate so much, compared with the all-subcarrier measurement scheme.

In the wavelength channels ch1-ch3, an SNR characteristic measured in another wavelength channel (in this example, the wavelength channel ch4) is used in a subcarrier frequency range having a large difference in the SNR characteristic between wavelength channels (in particular, the subcarrier range D). Therefore, in the wavelength channels ch1-ch3, a bit allocation error is large, and a transmission characteristic greatly deteriorates, compared with the all-subcarrier measurement scheme. In particular, in the wavelength channel ch1, a bit allocation error is large in the subcarrier range D, and therefore the transmission characteristic greatly deteriorates, compared with the all-subcarrier measurement scheme. However, when a DMT modulated optical signal is generated according to the all-subcarrier measurement scheme, bit error rates of the wavelength channels ch1-ch3 (in particular, the wavelength channel ch1) are low. Accordingly, in the first embodiment, even when a bit allocation error results in an increase in a bit error rate, the bit error rate can be suppressed to be smaller than or equal to the FEC limit.

As described above, according to the first embodiment, bit allocation is determined by measuring SNRs of a part of subcarriers in respective wavelength channels. Accordingly, the DMT negotiation time can be reduced, compared with the all-subcarrier measurement scheme in which bit allocation is determined by measuring SNRs of all of the subcarriers in the respective wavelength channels. In addition, common bit allocation is generated in such a way that a difference from the all-subcarrier measurement scheme is the smallest in a wavelength channel having the poorest SNR characteristic, and therefore a transmission characteristic of a DMT modulated optical signal can be suppressed from deteriorating.

In the example above, the processing time at stage 3 of DMT negotiation is reduced, but the embodiments are not limited to this method. Namely, the embodiments can be applied to stage 2 of DMT negotiation.

As an example, the coefficient calculator 24 calculates filter coefficients of the subcarriers SC1-SC64 in the wavelength channel ch1, calculates filter coefficients of the subcarriers SC65-SC128 in the wavelength channel ch2, calculates filter coefficients of the subcarriers SC129-SC192 in the wavelength channel ch3, and calculates filter coefficients of the subcarriers SC193-SC256 in the wavelength channel ch4. The filter coefficients calculated in the wavelength channels ch1-ch4 are given to the filters 42 in the respective DMT receivers 22-1 to 22-4. Namely, the same filter coefficients are given to the respective DMT receivers 22-1 to 22-4. By introducing this procedure, the DMT negotiation time can be further reduced.

Figure 13:
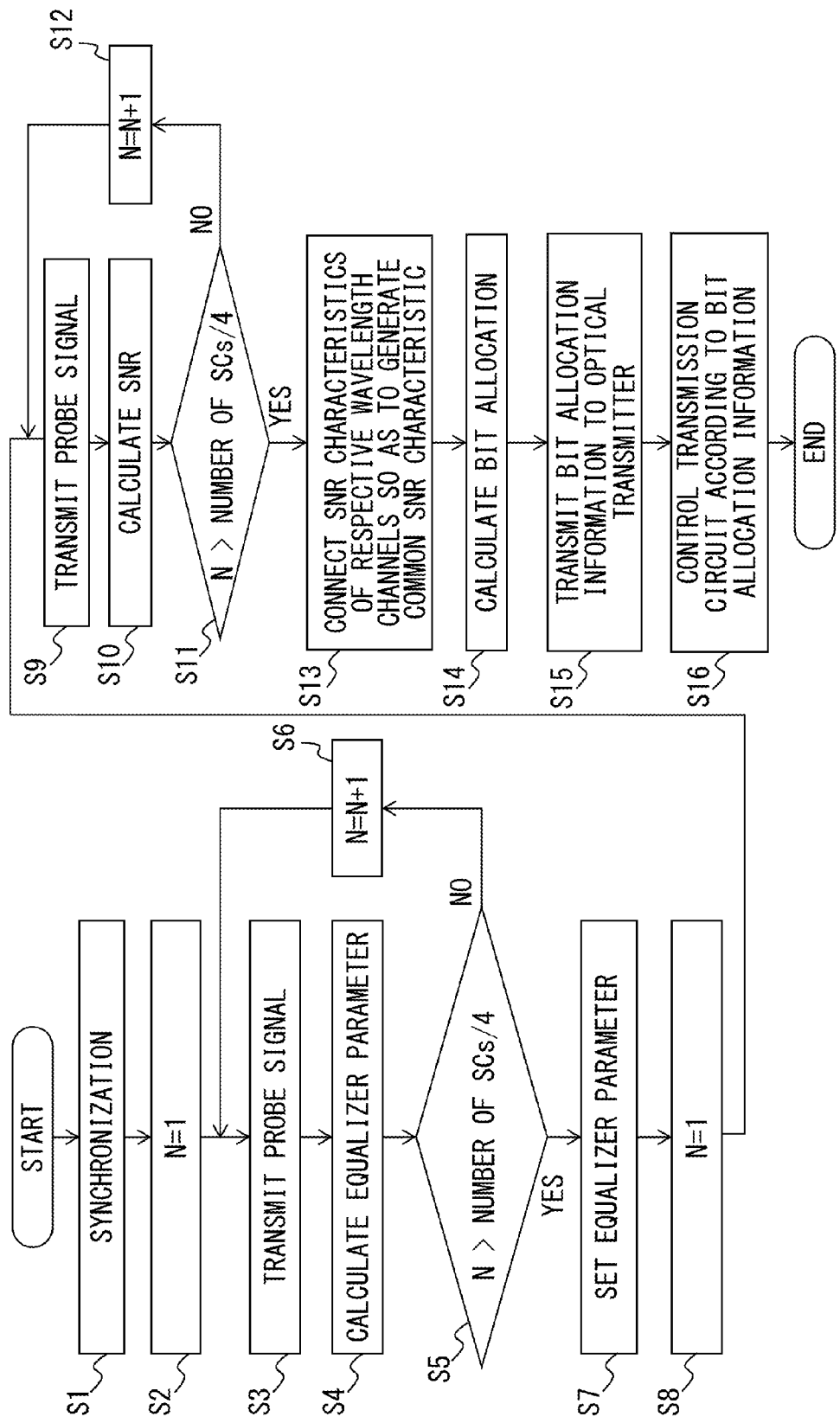
FIG. 13 is a flowchart illustrating an example of a bit allocation method according to the first embodiment.

FIG. 13 is a flowchart illustrating an example of a bit allocation method according to the first embodiment. In this example, four DMT modulated optical signals are multiplexed into a WDM optical signal transmitted from the optical transmission device 10 to the optical transmission device 20. Each of the DMT modulated optical signals includes 256 subcarriers in this example.

In S1, synchronization process is performed between the optical transmission device 10 and the optical transmission device 20. Namely, the optical transmission device 10 transmits a synchronization pilot signal to the optical transmission device 20. The optical transmission device 20 establishes synchronization by using the synchronization pilot signal. S1 corresponds to stage 1 of DMT negotiation.

In S2, the transmission circuit controller 13 initializes a variable N. An initial value of the variable N is "1". The variable N is used to count subcarriers.

In S3, the optical transmission device 10 transmits probe signals to the optical transmission device 20 by using subcarrier identified by the variable N. At this time, the transmission circuit controller 13 issues the following subcarrier selection instructions to the DMT transmitters 11-1 to 11-4.

DMT transmitter 11-1: N
DMT transmitter 11-2: N+64
DMT transmitter 11-3: N+128
DMT transmitter 11-4: N+192

The respective DMT transmitters 11-1 to 11-4 transmit probe signals according to the subcarrier selection instructions. As an example, when the variable N is "1", the DMT transmitter 11-1 transmits a probe signal by using the subcarrier SC1, the DMT transmitter 11-2 transmits a probe signal by using the subcarrier SC65, the DMT transmitter 11-3 transmits a probe signal by using the subcarrier SC129, and the DMT transmitter 11-4 transmits a probe signal by using the subcarrier SC193. When the variable N is "2", the DMT transmitter 11-1 transmits a probe signal by using the subcarrier SC2, the DMT transmitter 11-2 transmits a probe signal by using the subcarrier SC66, the DMT transmitter 11-3 transmits a probe signal by using the subcarrier SC130, and the DMT transmitter 11-4 transmits a probe signal by using the subcarrier SC194.

In S4, the optical transmission device 20 calculates equalizer parameters (for example, filter coefficients of the filter 42) by using the probe signals transmitted from the optical transmission device 10. At this time, the DMT receivers 22-1 to 22-4 respectively recover probe signals from corresponding DMT modulated optical signals. The coefficient calculator 24 calculates equalizer parameters according to the probe signals recovered by the DMT receivers 22-1 to 22-4. The calculated equalizer parameters are associated with subcarrier numbers, and are stored in a memory connected to the coefficient calculator 24.

In S5, the transmission circuit controller 13 determines whether the variable N is greater than "the number of subcarriers/4". When the variable N is smaller than or equal to "the number of subcarriers/4", the variable N is incremented by 1 in S6. Then the processing in the bit allocation method returns to S3. Namely, the processes of S3-S6 are repeatedly performed until the variable N is greater than "the number of subcarriers/4". Consequently, equalizer parameters of subcarriers SC1-SC64 are calculated in the wavelength channel ch1. Similarly, equalizer parameters of the subcarriers SC65-SC128 are calculated in the wavelength channel ch2, equalizer parameters of the subcarriers SC129-SC192 are calculated in the wavelength channel ch3, and equalizer parameters of the subcarriers SC193-SC256 are calculated in the wavelength channel ch4.

In S7, the coefficient calculator 24 gives the equalizer parameters collected from the wavelength channels ch1-ch4 in the DMT receivers 22-1 to 22-4. As an example, the equalizer parameters collected from the wavelength channel ch1 are respectively given to the filters 42 for the subcarriers SC1-SC64 in the respective DMT receivers 22-1 to 22-4. Similarly, the equalizer parameters collected from the wavelength channel ch2 are respectively given to the filters for the subcarriers SC65-SC128 in the respective DMT receivers 22-1 to 22-4, the equalizer parameters collected from the wavelength channel ch3 are respectively given to the filters for the subcarriers SC129-C192 in the respective DMT receivers 22-1 to 22-4, and the equalizer parameters collected from the wavelength channel ch4 are respectively given to the filters 42 for the subcarriers SC193-SC256 in the respective DMT receivers 22-1 to 22-4. In S8, the variable N is initialized to "1".

In S9, the optical transmission device 10 transmits probe signals to the optical transmission device 20 by using subcarriers identified by the variable N. The processes of S3 and S9 are substantially the same as each other, and the duplicate description is omitted. However, the data pattern of the probe signals transmitted in S9 may be different from the data pattern of the probe signals transmitted in S3.

In S10, the optical transmission device 20 measures SNRs by using the probe signals transmitted from the optical transmission device 10. At this time, the DMT receivers 22-1 to 22-4 respectively recover probe signals from corresponding DMT modulated optical signals. The SNR calculator 25 calculates SNRs according to the probe signals recovered by the DMT receivers 22-1 to 22-4. The calculated SNR values are associated with subcarrier numbers, and are stored in a memory connected to the SNR calculator 25.

In S11, the transmission circuit controller 13 determines whether the variable N is greater than "the number of subcarriers/4". When the variable N is smaller than or equal to "the number of subcarriers/4", the variable N is incremented by 1 in S12. Then the processing in the bit allocation method returns to S9. Namely, the processes of S9-S12 are repeatedly performed until the variable N is greater than "the number of subcarriers/4". Consequently, SNRs of the subcarriers SC1-SC64 are calculated in the wavelength channel ch1. Similarly, SNRs of the subcarriers SC65-SC128 are calculated in the wavelength channel ch2, SNRs of the subcarriers SC129-SC192 are calculated in the wavelength channel ch3, and SNRs of the subcarriers SC193-SC256 are calculated in the wavelength channel ch4.

In S13, the SNR calculator 25 connects SNR characteristics of the wavelength channels ch1-ch4 so as to generate a common SNR characteristic. In this example, the SNR characteristic of the wavelength channel ch1 is employed for the subcarriers SC1-SC64, the SNR characteristic of the wavelength channel ch2 is employed for the subcarriers SC65-SC128, the SNR characteristic of the wavelength channel ch3 is employed for the subcarriers SC129-SC192, and the SNR characteristic of the wavelength channel ch4 is employed for the subcarriers SC193-SC256, as illustrated in FIG. 9.

In S14, the bit allocator 26 determines bit allocation according to the common SNR characteristic generated by the SNR calculator 25. Specifically, the number of bits to be allocated to each of the subcarriers SC1-SC256 is determined according to the common SNR characteristic. The bit allocation determined by the bit allocator 26 is the same for the wavelength channels ch1-ch4. The bit allocator 26 transmits bit allocation information indicating the bit allocation to the optical transmission device 10 in S15.

In S16, the transmission circuit controller 13 controls transmission circuits of the DMT transmitters 11-1 to 11-4 according to the bit allocation information. The bit allocation is common in the respective wavelength channels ch1-ch4. Accordingly, the transmission circuits in the DMT transmitters 11-1 to 11-4 are controlled according to the same bit allocation information so as to be in the same state. At this time, the distributer 31 distributes input data to the mappers 32 according to the bit allocation information. The respective mappers 32 operate in a modulation format determined according to the bit allocation information. The mappers 32 are provided for respective subcarriers SC1-SC256.

In the optical transmission device 20, receiver circuits in the DMT receivers 22-1 to 22-4 are controlled according to the same bit allocation information so as to be in the same state. At this time, the respective demappers 44 recognize modulation formats of signals to be demodulated in accordance with the bit allocation information. The multiplexer 45 multiplexes data signals recovered by the demappers 44 in accordance with the bit allocation information. The demappers 44 are respectively provided for subcarriers SC1-SC256.

Second Embodiment

According to the first embodiment, a common SNR characteristic is generated for a plurality of wavelength channels, and the same bit allocation is determined for the plurality of wavelength channels in accordance with the common SNR characteristic. In contrast, according to a second embodiment, bit allocation is corrected in accordance with a characteristic of an optical transmission line through which a plurality of DMT modulated optical signals are transmitted. As an example, the bit allocation determined in the bit allocation method according to the first embodiment is corrected in accordance with chromatic dispersion of an optical transmission line. The configuration of an optical transmission system according to the second embodiment may be substantially the same as the configuration according to the first embodiment.

Figure 14:
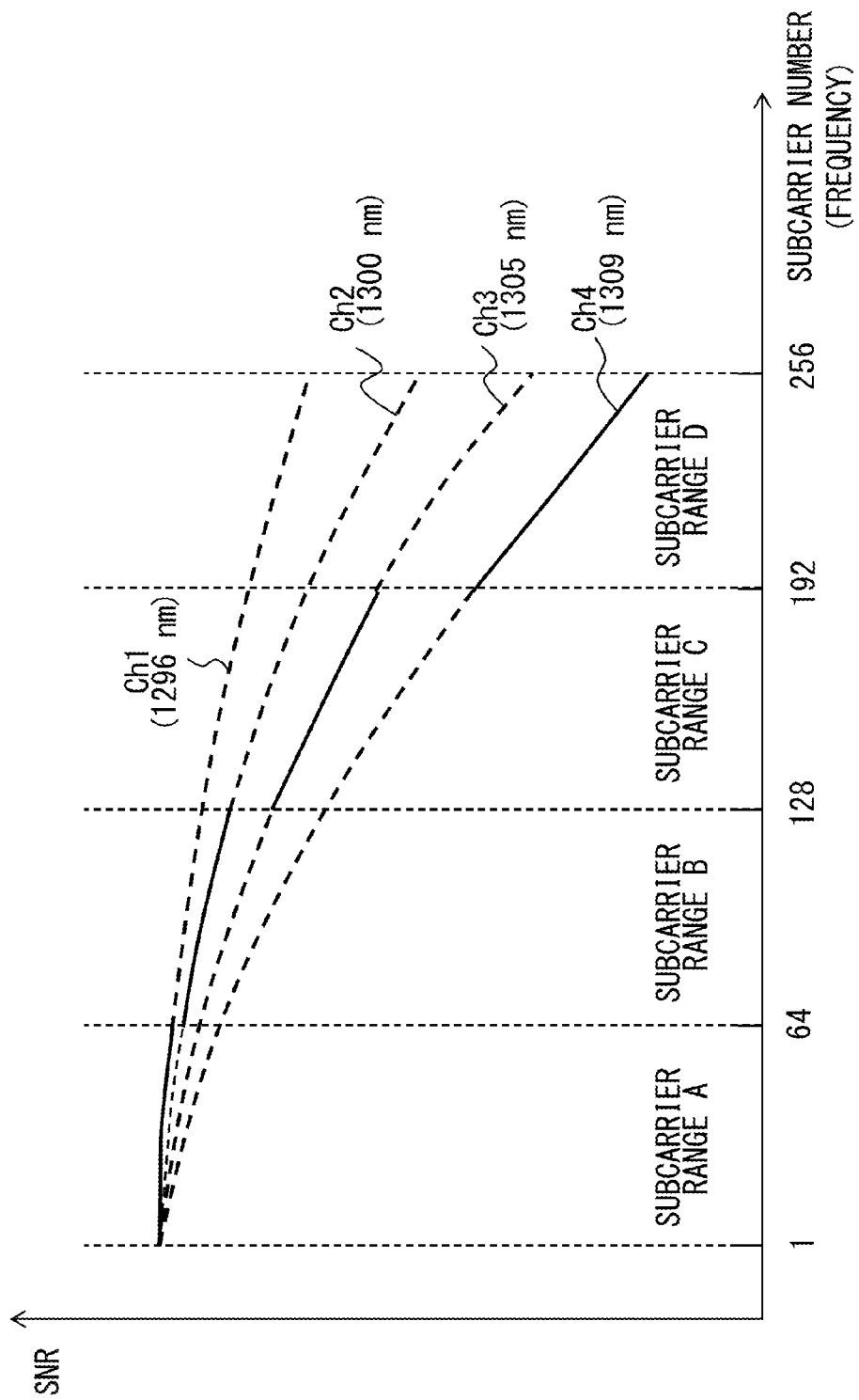
FIG. 14 illustrates an example of a method for determining bit allocation according to a second embodiment.

FIG. 14 illustrates an example of a method for determining bit allocation according to the second embodiment. In this example, similarly to the first embodiment, SNR characteristics of the subcarriers SC1-SC64 are measured in the wavelength channel ch1, SNR characteristics of the subcarriers SC65-SC128 are measured in the wavelength channel ch2, SNR characteristics of the subcarriers SC129-SC192 are measured in the wavelength channel ch3, and SNR characteristics of the subcarriers SC193-SC256 are measured in the wavelength channel ch4. In FIG. 14, SNR characteristics obtained as a result of measurement are illustrated with a solid line.

Wavelength dependency and frequency dependency of a transmission characteristic (in this example, an SNR) are dependent of chromatic dispersion of an optical transmission line. Accordingly, if chromatic dispersion of an optical transmission line is known, the wavelength dependency and the frequency dependency of an SNR can be estimated. The chromatic dispersion of the optical transmission line can be calculated according to a transmission distance and a dispersion characteristic of an optical fiber.

In an optical transmission system according to the second embodiment, transmission line information indicating a transmission distance of an optical transmission line between the optical transmission devices 10 and 20 and a dispersion characteristic of an optical fiber is given to the SNR calculator 25. The SNR calculator 25 calculates an SNR correction value according to the transmission line information. The SNR calculator 25 corrects an SNR characteristic obtained as a result of measurement by using the SNR correction value so as to generate a corrected SNR characteristic.

As an example, in the subcarrier range D illustrated in FIG. 14, SNRs are measured by using a DMT modulated optical signal in the wavelength channel ch4. Accordingly, in the subcarrier range D, corrected SNR characteristics of the wavelength channels ch1, ch2, and ch3 are calculated by correcting the SNR characteristic of the wavelength channel ch4. Similarly, in the subcarrier range C, corrected SNR characteristics of the wavelength channels ch1, ch2, and ch4 are calculated by correction the SNR characteristic of the wavelength channel ch3. In the subcarrier range B, corrected SNR characteristics of the wavelength channels ch1, ch3, and ch4 are calculated by correcting the SNR characteristic of the wavelength channel ch2. In the subcarrier range A, corrected SNR characteristics of the wavelength channels ch2, ch3, and ch4 are calculated by correcting the SNR characteristic of the wavelength channel ch1.

Figure 15:
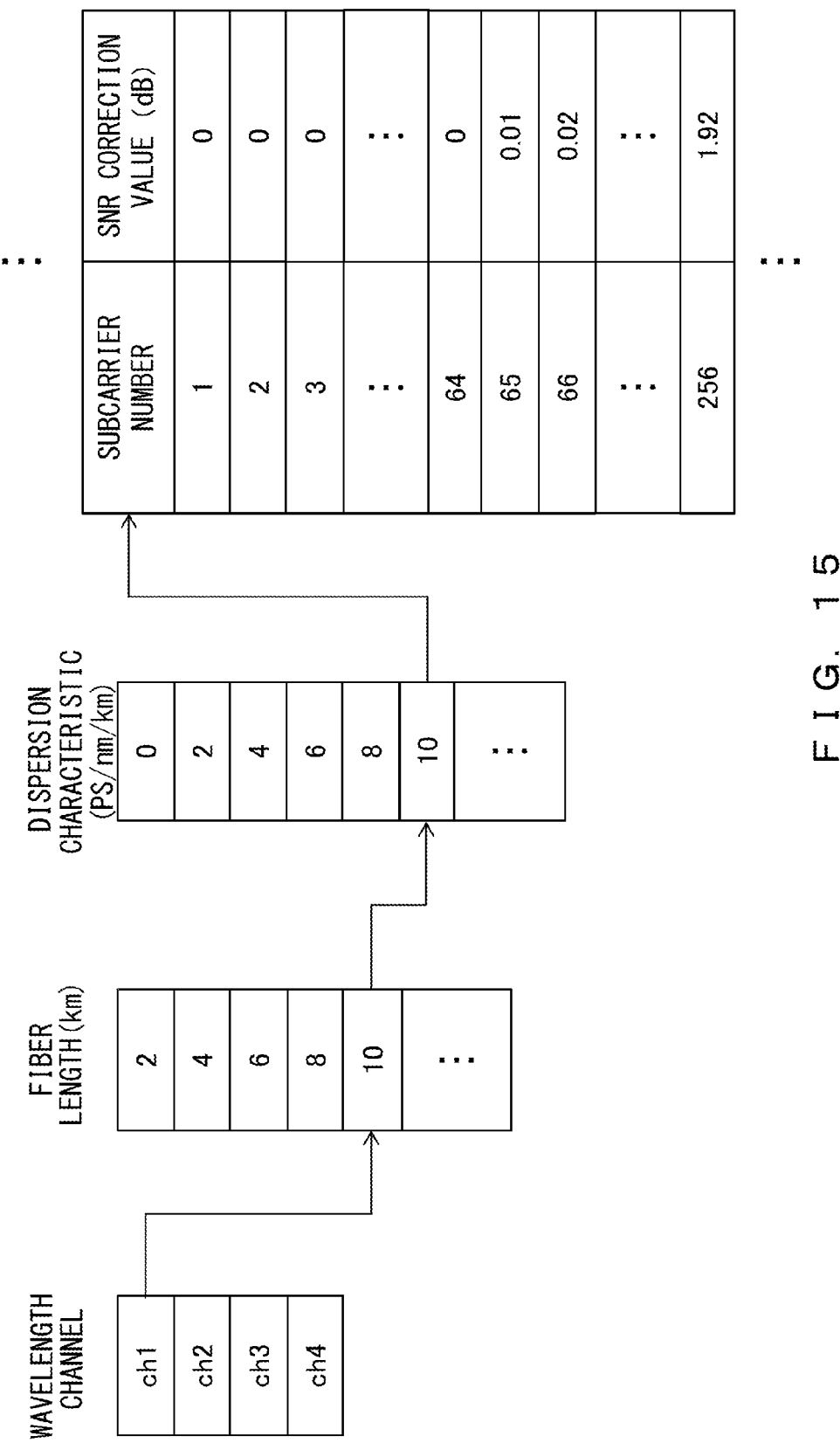
FIG. 15 illustrates an example of a correction value table.

FIG. 15 illustrates an example of a correction value table for determining an SNR correction value. In the correction value table, an SNR correction value is stored for each of the subcarrier numbers in association with a combination of a channel ID for identifying a wavelength channel, a fiber length, and a dispersion characteristic. The fiber length corresponds to the transmission distance of the optical transmission line between the optical transmission devices 10 and 20. The dispersion characteristic indicates a characteristic of the optical fiber. Assume that the SNR correction value of each of the subcarriers is obtained, for example, by performing measurement or simulation in advance.

In the example illustrated in FIG. 15, a corrected SNR characteristic of the wavelength channel ch1 is generated. The fiber length is 10 km, and the dispersion characteristic of the optical fiber is 10 ps/nm/km.

In the subcarrier range A, the SNR calculator 25 adds an SNR correction value that corresponds to an SNR measured in the wavelength channel ch1. In the subcarrier range A, the SNR of the wavelength channel ch1 is measured, and therefore the SNR correction value is zero. In the subcarrier range B, the SNR calculator 25 adds an SNR correction value that corresponds to an SNR measured in the wavelength channel ch2. As an example, a corrected SNR of the subcarrier SC65 in the wavelength channel ch1 is calculated by adding "0.01" to an SNR of the subcarrier SC65 measured in the wavelength channel ch2. A corrected SNR of the subcarrier SC66 in the wavelength channel ch1 is calculated by adding "0.02" to an SNR of the subcarrier SC66 measured in the wavelength channel ch2. Similarly, in the subcarrier range C, an SNR correction value that corresponds to an SNR measured in the wavelength channel ch3 is added, and in the subcarrier range D, an SNR correction value that corresponds to an SNR measured in the wavelength channel ch4 is added. As an example, a corrected SNR of the subcarrier SC256 in the wavelength channel ch1 is calculated by adding "1.92" to an SNR of the subcarrier SC256 measured in the wavelength channel ch4.

Corrected SNR characteristics of the wavelength channels ch2-ch4 are generated in a similar method. Namely, different corrected SNR characteristics are generated for the respective wavelength channels. The bit allocator 26 determines bit allocation in each of the wavelength channels in accordance with the corrected SNR characteristics generated above. The transmission circuit controller 13 controls the transmission circuits of the DMT transmitters 11-1 to 11-4 in accordance with bit allocation information given from the bit allocator 26.

The SNR characteristics corrected as described above are approximate to SNR characteristics obtained by measuring SNRs of all of the subcarriers in the respective wavelength channels. Accordingly, a transmission characteristic of a DMT modulated optical signal according to the second embodiment is improved, compared with the first embodiment. The DMT negotiation time according to the second embodiment is almost the same as that according to the first embodiment, and the DMT negotiation time according to the second embodiment is shorter than the DMT negotiation time in a scheme for measuring SNRs of all of the subcarriers.

Third Embodiment

According to the first embodiment, one common SNR characteristic is generated for a plurality of wavelength channels that are multiplexed into a WDM optical signal, and bit allocation is determined according to the common SNR characteristic. In contrast, according to a third embodiment, a plurality of common SNR characteristics are generated for a plurality of wavelength channels that are multiplexed into a WDM optical signal, and bit allocation is determined according to each of the common SNR characteristics.

Figure 16:
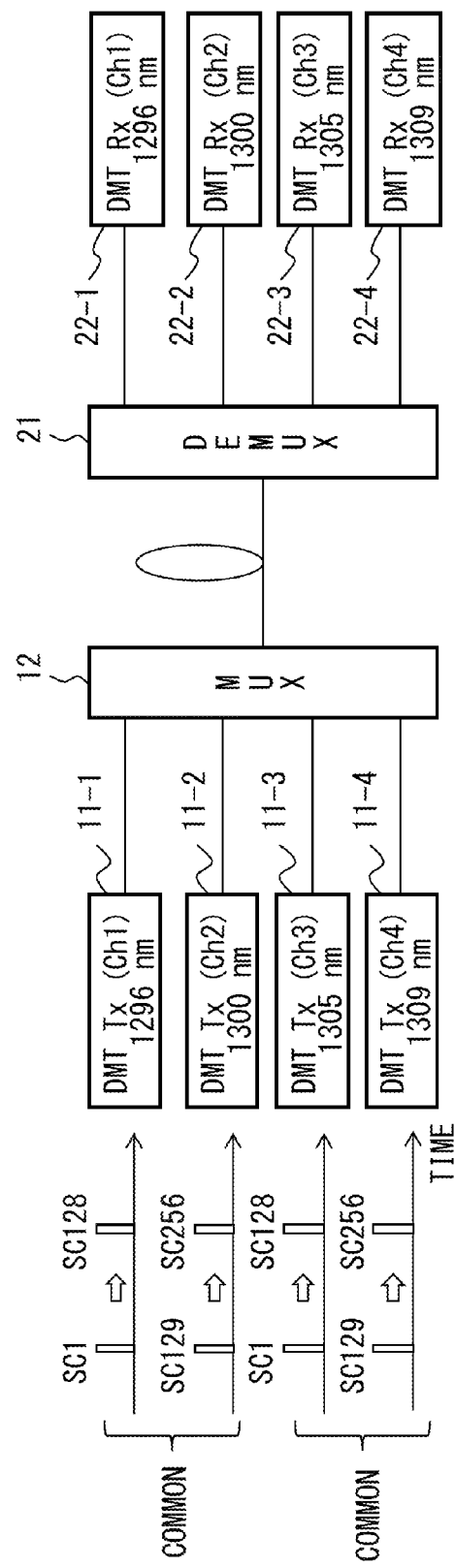
FIG. 16 illustrates an example of DMT negotiation according to a third embodiment.

FIG. 16 illustrates an example of DMT negotiation according to the third embodiment. In this example, a common SNR characteristic is generated for the wavelength channels ch1 and ch2, and another common SNR characteristic is generated for the wavelength channels ch3 and ch4. In this case, SNRs of the subcarriers SC1-SC128 are sequentially measured in the wavelength channel ch1, and SNRs of the subcarriers SC129-SC256 are sequentially measured in the wavelength channel ch2. In addition, SNRs of the subcarriers SC1-SC128 are sequentially measured in the wavelength channel ch3, and SNRs of the subcarriers SC129-SC256 are sequentially measured in the wavelength channel ch4. At this time, SNR measurement is performed in parallel in the wavelength channels ch1-ch4.

FIG. 17 illustrates SNR characteristics obtained in DMT negotiation according to the third embodiment. A solid line indicates a common SNR characteristic X for the wavelength channels ch1 and ch2, and a broken line indicates a common SNR characteristic Y for the wavelength channels ch3 and ch4. The bit allocator 26 determines bit allocation for the wavelength channels ch1 and ch2 in accordance with the common SNR characteristic X. The bit allocator 26 also determines bit allocation for the wavelength channels ch3 and ch4 in accordance with the common SNR characteristic Y.

As described above, according to the embodiments, in an optical transmission system that transmits a plurality of multicarrier signals in wavelength division multiplexing, the time needed to determine bit allocation of each of the plurality of multicarrier signals can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A bit allocation method used in an optical transmission system in which a first wavelength channel that transmits a first multicarrier signal including a plurality of subcarriers arranged in a specified subcarrier frequency range and a second wavelength channel that transmits a second multicarrier signal including a plurality of subcarriers arranged in the subcarrier frequency range are multiplexed, transmission characteristics of the second wavelength channel being different from transmission characteristics of the first wavelength channel, the bit allocation method comprising:

measuring transmission characteristics of subcarriers included in the first multicarrier signal in a first subcarrier frequency range within the subcarrier frequency range;

measuring transmission characteristics of subcarriers included in the second multicarrier signal in a second subcarrier frequency range that is different from the first subcarrier frequency range within the subcarrier frequency range; and determining a number of bits to be allocated to each of the subcarriers included in the first multicarrier signal and a number of bits to be allocated to each of the subcarriers included in the second multicarrier signal based on the transmission characteristics of the subcarriers included in the first multicarrier signal measured in the first subcarrier frequency range and the transmission characteristics of the subcarriers included in the second multicarrier signal measured in the second subcarrier frequency range.

2. The bit allocation method according to claim 1, further comprising generating common transmission characteristics by combining the transmission characteristics of the first multicarrier signal measured in the first subcarrier frequency range and the transmission characteristics of the second multicarrier signal measured in the second subcarrier frequency range, wherein both of the number of bits to be allocated to each of the subcarriers included in the first multicarrier signal and the number of bits to be allocated to each of the subcarriers included in the second multicarrier signal are determined based on the common transmission characteristics.

3. The bit allocation method according to claim 1, wherein a number of subcarriers that belong to the first subcarrier frequency range is the same as a number of subcarriers that belong to the second subcarrier frequency range, and the measuring process for the first subcarrier frequency range is performed in parallel with the measuring process for the second subcarrier frequency range.

4. The bit allocation method according to claim 1, wherein when a difference in the transmission characteristics between the first multicarrier signal and the second multicarrier signal in the second subcarrier frequency range is larger than a difference in the transmission characteristics between the first multicarrier signal and the second multicarrier signal in the first subcarrier frequency range, and when the transmission quality of the first multicarrier signal is higher than the transmission quality of the second multicarrier signal, the transmission characteristics of the subcarriers included in the first multicarrier signal are measured within the first subcarrier frequency range, and the transmission characteristics of the subcarriers included in the second multicarrier signal are measured within the second subcarrier frequency range.

5. The bit allocation method according to claim 1, wherein when the first multicarrier signal and the second multicarrier signal are transmitted in a wavelength band of 1.3 μm in wavelength division multiplexing, and when the second subcarrier frequency range is higher than the first subcarrier frequency range, and when a wavelength of the first wavelength channel is shorter than a wavelength of the second wavelength channel, the transmission characteristics of the subcarriers included in the first multicarrier signal are measured within the first subcarrier frequency range, and the transmission characteristics of the subcarriers included in the second multicarrier signal are measured within the second subcarrier frequency range.

6. The bit allocation method according to claim 1, further comprising generating first corrected transmission characteristics from the transmission characteristics of the second multicarrier signal measured in the second subcarrier frequency range according to a characteristic of an optical transmission line through which the first and second multicarrier signals are transmitted;

generating first individual transmission characteristics indicating the transmission characteristics for the first multicarrier signal by combining the transmission characteristics of the first multicarrier signal measured in the first subcarrier frequency range and the first corrected transmission characteristics;

generating second corrected transmission characteristics from the transmission characteristics of the first multicarrier signal measured in the first subcarrier frequency range according to the characteristic of the optical transmission line; and generating second individual transmission characteristics indicating the transmission characteristics for the second multicarrier signal by combining the second corrected transmission characteristics and the transmission characteristics of the second multicarrier signal measured in the second subcarrier frequency range, wherein the number of bits to be allocated to each of the subcarriers included in the first multicarrier signal is determined in accordance with the first individual transmission characteristics and the number of bits to be allocated to each of the subcarriers included in the second multicarrier signal is determined in accordance with the second individual transmission characteristics.

7. An optical transmission system that transmits a first multicarrier signal including a plurality of subcarriers arranged in a specified subcarrier frequency range and a second multicarrier signal including a plurality of subcarriers arranged in the subcarrier frequency range in wavelength division multiplexing from a first optical transmission device to a second optical transmission device, frequency characteristics of subcarriers included in the first multicarrier signal being different from frequency characteristics of subcarriers included in the second multicarrier signal, the optical transmission system comprising:

first and second transmitters configured to respectively transmit the first and second multicarrier signals to the second optical transmission device, the first and second transmitters being provided in the first optical transmission device;

a calculator configured to calculate transmission characteristics of the subcarriers included in each of the first and second multicarrier signals, the calculator being provided in the second optical transmission device;

a bit allocator configured to determine bit allocation indicating numbers of bits to be allocated to the subcarriers included in each of the first and second multicarrier signals in accordance with the transmission characteristics calculated by the calculator; and a controller configured to control the first and second transmitters in accordance with the bit allocation, the controller being provided in the first optical transmission device, wherein a first subcarrier frequency range in the subcarrier frequency range is allocated to the first transmitter, a second subcarrier frequency range that is different from the first subcarrier frequency range in the subcarrier frequency range is allocated to the second transmitter, the first transmitter transmits probe signals to the second optical transmission device by using subcarriers that belong to the first subcarrier frequency range, the second transmitter transmits probe signals to the second optical transmission device by using subcarriers that belong to the second subcarrier frequency range, the calculator measures transmission characteristics of the probe signals in the first subcarrier frequency range and transmission characteristics of the probe signals in the second subcarrier frequency range, the bit allocator determines a number of bits to be allocated to each of the subcarriers included in the first multicarrier signal and a number of bits to be allocated to each of the subcarriers included in the second multicarrier signal based on the transmission characteristics of the probe signals in the first multicarrier signal measured in the first subcarrier frequency range and the transmission characteristics of the probe signals in the second multicarrier signal measured in the second subcarrier frequency range, and the controller controls the first and second transmitters in accordance with the bit allocation.

* * * * *